US010795933B1

(12) United States Patent
Langley et al.

(10) Patent No.: US 10,795,933 B1
(45) Date of Patent: Oct. 6, 2020

(54) SYSTEM AND METHOD FOR OBJECT BASED QUERY OF VIDEO CONTENT CAPTURED BY A DYNAMIC SURVEILLANCE NETWORK

(71) Applicant: FLOCK GROUP INC., Atlanta, GA (US)

(72) Inventors: Garrett Langley, Atlanta, GA (US); Matt Feury, Atlanta, GA (US)

(73) Assignee: FLOCK GROUP INC., Atlanta, GA (US)

( * ) Notice: Subject to any disclaimer, the term of this patent is extended or adjusted under 35 U.S.C. 154(b) by 110 days.

(21) Appl. No.: 15/968,402

(22) Filed: May 1, 2018

(51) Int. Cl.
G06K 9/00 (2006.01)
G06F 16/783 (2019.01)
G06N 5/04 (2006.01)
G06F 16/73 (2019.01)
G06F 16/78 (2019.01)

(52) U.S. Cl.
CPC .......... *G06F 16/7837* (2019.01); *G06F 16/73* (2019.01); *G06F 16/78* (2019.01); *G06K 9/00744* (2013.01); *G06K 9/00771* (2013.01); *G06N 5/046* (2013.01)

(58) Field of Classification Search
CPC ...... G06F 16/7837; G06F 16/73; G06F 16/78; G06K 9/00744; G06K 9/00771; G06N 5/046
See application file for complete search history.

(56) References Cited

U.S. PATENT DOCUMENTS

| 757,996 | A | 4/1904 | Calvin |
| 7,466,223 | B2 | 12/2008 | Sefton |
| 7,504,965 | B1 | 3/2009 | Windover et al. |
| 7,825,829 | B2 | 11/2010 | Madsen |
| 8,218,046 | B1 | 7/2012 | Tashiro |
| 8,478,889 | B2 | 7/2013 | Bestgen et al. |
| 9,761,135 | B2 | 9/2017 | Chen et al. |
| 9,791,766 | B2 | 10/2017 | Ekin |
| 2010/0052947 | A1 | 3/2010 | Lin et al. |
| 2013/0241730 | A1* | 9/2013 | Saitwal .................. H04N 7/002 340/540 |
| 2014/0072177 | A1 | 3/2014 | Chou et al. |
| 2014/0146172 | A1 | 5/2014 | Kajitani et al. |
| 2014/0210646 | A1 | 7/2014 | Subramanya |

(Continued)

OTHER PUBLICATIONS www.a2zsecuritycameras.com website; accessed Jan. 2018; four pages.
www.radiusvision.com website; accessed Jan. 2018; three pages.

*Primary Examiner* — Xin Jia
(74) *Attorney, Agent, or Firm* — Smith Tempel; Steven P. Wigmore

(57) ABSTRACT

A solution for a video surveillance system and method that leverages a dynamic geographic footprint and supports an object-based query of archived video content is described. An exemplary embodiment of the solution receives video footage from any number of unrelated sources. The video footage is parsed for content and stored in a database in connection with data that identifies the content (object class, aspects of the object, confidence scores, time and location data, etc.). Advantageously, the video footage may be queried based on content of the video footage and not just time and location data. In this way, embodiments of the solution provide for efficient query and review of relevant video footage.

20 Claims, 13 Drawing Sheets

(56) References Cited

U.S. PATENT DOCUMENTS

| | | |
|---|---|---|
| 2014/0218527 A1 | 8/2014 | Subramanya |
| 2014/0254879 A1 | 9/2014 | Smith |
| 2016/0034477 A1 | 2/2016 | Mao et al. |
| 2016/0275375 A1* | 9/2016 | Kant .................... G06K 9/4604 |
| 2017/0110013 A1 | 4/2017 | Frangiadakis et al. |
| 2018/0107880 A1* | 4/2018 | Danielsson ............. G06T 7/292 |

* cited by examiner

SYSTEM AND METHOD FOR OBJECT BASED QUERY OF VIDEO CONTENT CAPTURED BY A DYNAMIC SURVEILLANCE NETWORK

BACKGROUND

Video surveillance is a common, and important, component of almost any security or monitoring system in this digital age. Video surveillance cameras are found in home security systems, bank security systems, industrial plant site security systems, in-store monitoring systems, traffic monitoring systems, neighborhood watch systems, and even personal computing devices, among other systems. All these video surveillance cameras that have become so ubiquitous in today's society are very efficient at capturing video content, in many cases high quality video content. Current systems and methods for aggregation and query of the captured video content, however, leave much room for improvement.

Consider, for example, a neighborhood watch system that includes a plurality of video surveillance cameras strategically positioned around a neighborhood. As would be expected, each camera in the neighborhood watch system captures video around the clock of anything (or nothing) that enters its field of view. That's a lot of video footage. Some cameras may even "scan" or slowly oscillate in order to capture even more video content of an even larger field of view.

It's easy to understand the value of all that video content captured by the neighborhood watch system in the event that there's a burglary in the neighborhood. Very likely, one or more of the video surveillance cameras in the neighborhood watch system captured on video the burglar and/or his mode of transportation, perhaps multiple times from multiple angles. That information can be used by authorities, obviously, to apprehend the burglar. The problem, however, is how to determine which segments of all that captured video may include relevant information.

Without knowing the exact time of the burglary, or route the burglar took within the neighborhood, detectives may have to review untold hours of video footage in an effort to identify relevant content. As for the possibility that the burglar was captured by a video surveillance camera that is not a part of the neighborhood watch system, such as by a local store camera nearby or a pedestrian with a smartphone or a homeowner's personal home security system, the detectives have to identify and review those footages separately from the footage associated with the neighborhood watch system database.

Prior art systems for capturing and managing video surveillance footage fall short. Prior art systems for capturing surveillance video are limited to a predefined geographical footprint, leaving users to speculate what other surveillance systems may have captured relevant content. And, prior art systems are limited to query of archived video footage based on time and location inputs—if a user doesn't know the time and location that relevant content may have been captured by a video surveillance system, then finding the relevant content may require review of copious amounts of irrelevant video footage which is a time consuming and inefficient process. Therefore, there is a need in the art for a video surveillance system and method that leverages a dynamic geographic footprint and supports an object-based query of archived video content.

SUMMARY OF THE DISCLOSURE

A method and system are described for generating an object-based database of video footage captured by a dynamic surveillance network. The surveillance network is dynamic because embodiments of the system are not constrained by any geographic footprint associated with a set network of surveillance devices; rather, embodiments of the system can leverage a dynamic geographic footprint defined by the geographic locations of unrelated surveillance devices configured to upload video streams to the system (such as surveillance cameras in a neighborhood watch system, store cameras at a local convenience store, traffic monitoring cameras at a nearby street intersection, a smartphone associated with a pedestrian, etc).

An exemplary embodiment of the solution comprises a method that begins with capturing a plurality of video streams. The video streams, as would be understood by one of ordinary skill in the art, are each comprised of a series of image frames and each image frame comprises content (i.e., subject matter). The method determines the time and location data associated with each of the plurality of video streams and then analyzes the content of one or more image frames of each of the plurality of video streams in order to identify objects (e.g., a human being, a vehicle, an animal, etc.). For each identified object in each of the plurality of video streams, the method applies one or more neural network algorithms to classify the identified object and aspects of the identified object (e.g., the object is a human, is male, is wearing a jacket, and is about 5'11" and 190 pounds). With objects identified and classified and aspects determined, the method creates a database record for each of the plurality of video streams by storing the respective video stream in a database. The database record includes the respective video stream in association with its time and location data, its object class and the aspect data of the object.

For some embodiments of the method, for each identified object a confidence score for each of one or more of the object class and the aspects may be generated and stored in the respective database record. With the video footages stored in the database in association with not only time and location data, but also with object classification data, aspect data for the objects, confidence scores, etc., the method may query the database using input query parameters that comprise one or more of a target object class, a target aspect, a confidence score, etc.

In this way, the exemplary method may return for viewing one or more of the plurality of video streams if the input query parameters are statistically significantly the same as the respective object class and aspect data associated with the one or more of the plurality of video streams. The method may also generate a report in one of a timeline format, a map format and an object format. Further, the method may, based on the classification of the identified object and aspects of the identified object, generate an alarm.

To improve the statistical analysis and confidence score calculations, the exemplary embodiment may also, for each identified object captured in a given image frame, calculate fingerprint data and record the fingerprint data in the database in association with the identified object. Fingerprint data may include any one or more of, but is not limited to including any one or more of, a hash value, quantity of Hough lines, non-zero pixel ratio, black/white pixel ratio, white balance value, object size, and neighborhood data (a planar, induced subgraph of all relevant objects or other known indicators adjacent to a given identified object). Similarly, when conducting a historical analysis, the exemplary embodiment may, for each identified object, compare its fingerprint data with fingerprint data associated with objects identified from content of other frames and/or other video streams previously analyzed.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the figures. Letter character designations for reference numerals may be omitted when it is intended that a reference numeral encompass all parts having the same reference numeral in all figures.

DETAILED DESCRIPTION

Figure 1A:
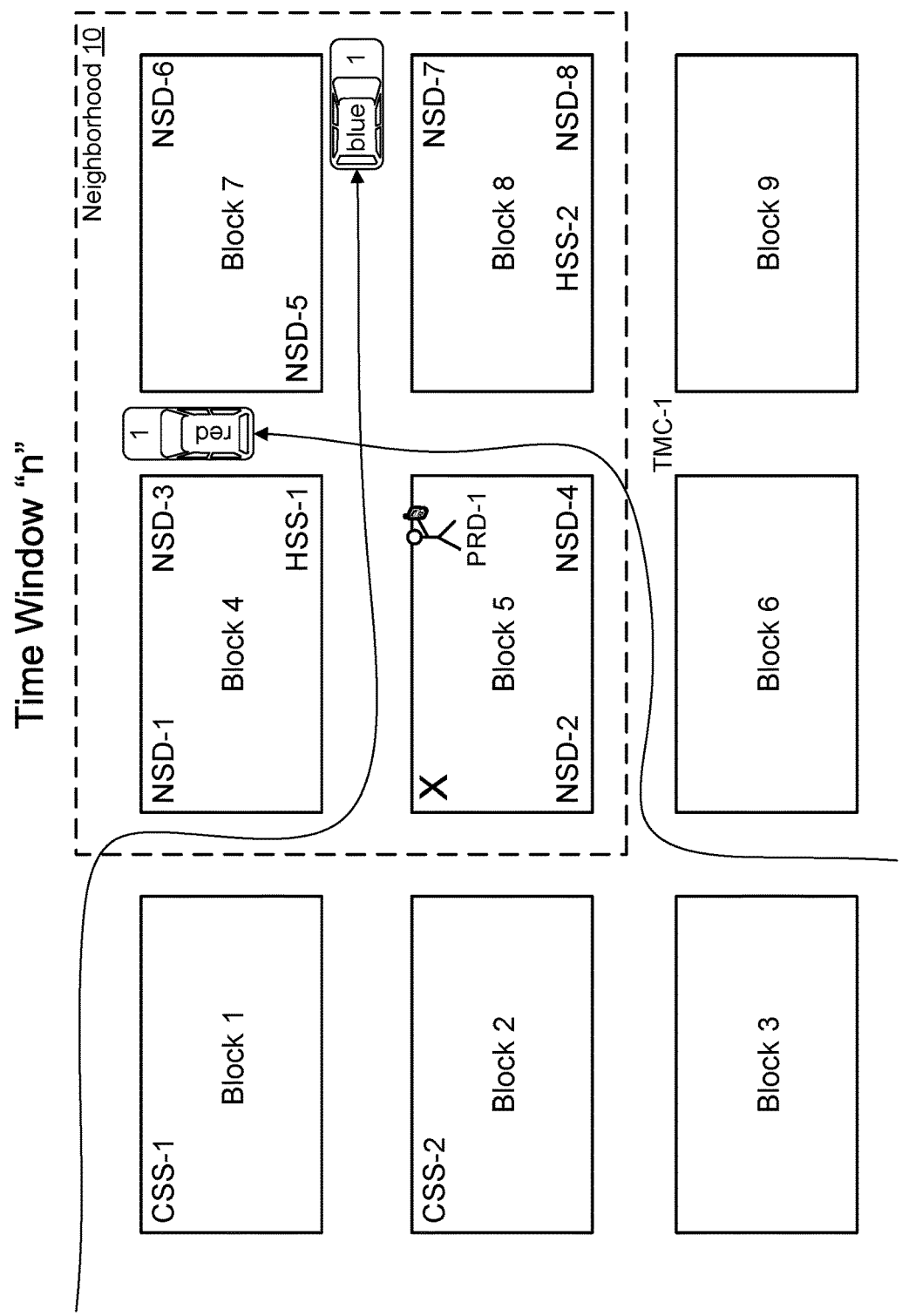
FIGS. 1A-1C collectively illustrate a surveillance scenario in which an embodiment of a dynamic surveillance and object-based query ("DSOQ") system according to the solution may be advantageously employed.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as image frames or other data files that need to be accessed, analyzed, transmitted and/or rendered.

In this description, the term "symbology" is used to generally refer to any type of matrix barcode (or multidimensional bar code) or identifier associated with an object identified in a video image frame, including an automobile tag or parking sticker or other object identifier, and is not meant to limit the scope of any embodiment to the use of a specific type of barcode, such as, for example, what may be understood in the art to be a quick response code.

That is, it is envisioned that any given embodiment of the systems and methods within the scope of this disclosure may use any type of machine-readable symbology or combinations of machine-readable symbologies so long as such symbologies are associated with either predefined feature descriptions or sets of positive/negative examples of instances of the given symobology itself. Moreover, as one of ordinary skill in the art understands, a symbology in the form of a matrix barcode is an optical machine-readable label that may be associated with data such as data representative of an inventoried item.

An exemplary matrix barcode, for example, may include black modules (square dots) arranged in a square grid on a white background. The information encoded by the barcode may be comprised of four standardized types of data (numeric, alphanumeric, byte/binary, Kanji) or, through supported extensions, virtually any type of data. As one of ordinary skill in the art further understands, a symbology such as a matrix barcode may be read by an imaging device, such as a camera, and formatted algorithmically by underlying software using error correction algorithms until the image can be appropriately interpreted. Data represented by the barcode may then be extracted from patterns present in both horizontal and vertical components of the image.

In this description, the term "component network" refers to an induced subgraph, as would be understood by one of ordinary skill in the art of graph theory, defining all known items or structures within a geographic footprint contained within a larger, more comprehensive geographic footprint defined by a dynamic surveillance network. As an example, a residential neighborhood with a neighborhood watch system would be a "component network" within the geographic footprint of a dynamic surveillance network that comprises more or other "component networks" not associated with the residential neighborhood such as, but not limited to, a homeowner's personal surveillance system, a nearby stoplight monitoring camera, a nearby convenience store monitoring system, etc.

In this description, the term "fingerprint" or "object fingerprint" refers to any one or more features or measurable properties associated with an identified object such as, but not limited to, an automobile or animal. The features that define an object's fingerprint may be either numeric or structural in nature. As a way of example, and not limitation, features that may be used to define an object fingerprint include, but are not limited to, Hough lines, object height, object width, black/white pixel ratio, non-zero pixel ratio, white balance, hash value, etc.

In this description, the terms "video stream" and "video footage" are used interchangeably to refer to a series of temporally sequential image frames captured by a given video surveillance device (e.g., a security camera). A video stream may be of any length useful for the particular embodiment of the solution. Individual image frames contain "content" which is whatever was captured by the image whether it be a human, an animal, a vehicle, a tree, an empty parking lot, etc.

In this description, an "identifiable" object is any object within a video frame or frame composite for which all relevant features are detected and are independent from all other features detected from other partially or wholly identifiable objects. An object is "readable" if a symbology associated with an identified object may be accurately decoded or interpreted.

In this description, two identifiable and readable objects captured in separate video frames may be considered equivalent, and thus the same object, if an object similarity probability calculation exceeds a given threshold. Depending on an exemplary embodiment, such a probability calculation may consider the statistical significance of similarity among the objects' respective fingerprints, relative locations, object neighborhood, etc.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable devices having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "surveillance device," "portable recording device" and "video surveillance cameras" and the like are used interchangeably unless indicated otherwise. Examples of these devices may be, but are not limited to being a smartphone, a navigation device, a tablet personal computer ("PC"), a camera system, a commercial security system, a home security system, a traffic monitoring system, or a hand-held computer with a wireless connection or link.

In this description, the term "neural network" refers to an algorithmic system customized to identify objects and/or aspects of identified objects in a manner modeled after human cognitive processing. As would be understood by one of ordinary skill in the art, neural networks "learn" (i.e. progressively improve performance on) tasks by considering examples, generally without task-specific programming. For example, embodiments of the solution seeking to identify objects recognized in an image frame might leverage neural networks that learn to identify images that contain automobiles by analyzing example images that have been manually labeled as "automobile" or "no automobile" and using the results to identify automobiles in other images. Advantageously, embodiments of the solution may take a positive output from one neural network as an input to another, more specialized neural network in order to further and more precisely identify the object in an image frame. For example, embodiments of the solution may take a positive identification of an automobile and input the image into a neural network that has learned to identify color by analyzing example images that have been manually labeled as "blue" or "not blue", etc. and using the results to identify the color of objects in other images. In this way, embodiments of the solution may leverage a logical cascade of neural networks to identify an object in an image frame captured by a surveillance camera, determine the class of the object (e.g., it's an automobile), and determine aspects of the object (e.g., it's a blue, 2009 Ford Taurus with a single occupant).

Embodiments of the systems and methods provide for a video surveillance system and method that aggregates video footage from participating independent video footage sources, analyzes the video footage for content, and archives the video footage based on the results of the analysis such that portions of the video footage may be queried in view of the content. As will be more thoroughly explained in view of the various figures, a video stream or video footage is captured using either a stationary surveillance device (such as a mounted camera in a neighborhood watch system or on a traffic light monitoring system) or a portable surveillance device comprising a camera subsystem (such as a handheld smartphone or a drone-mounted system).

The video stream is analyzed on a frame by frame basis, or in some embodiments selective frames are analyzed, to identify subject matter content of the video steam and, in some embodiments, decode symbology codes that are a part of such content (e.g., a license plate or a parking sticker). Efficiently identifying and rendering relevant video footage for review, especially when relevant video footage may have been captured by multiple different cameras at multiple different times in multiple different locations, is a challenge addressed by embodiments of the solution.

Turning now to the figures, exemplary aspects of the solution will be more thoroughly described.

Figure 1B:
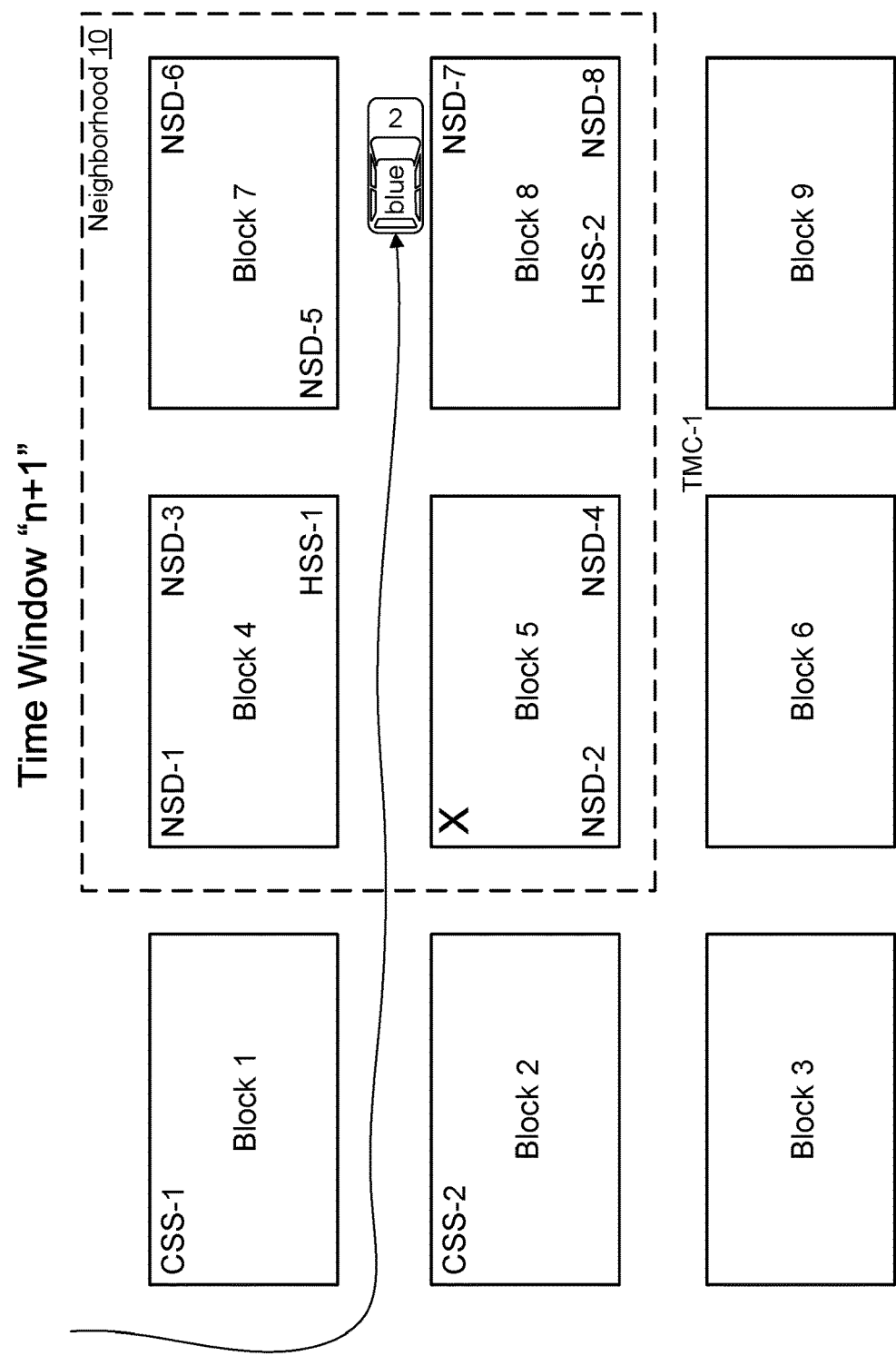
Figure 1C:
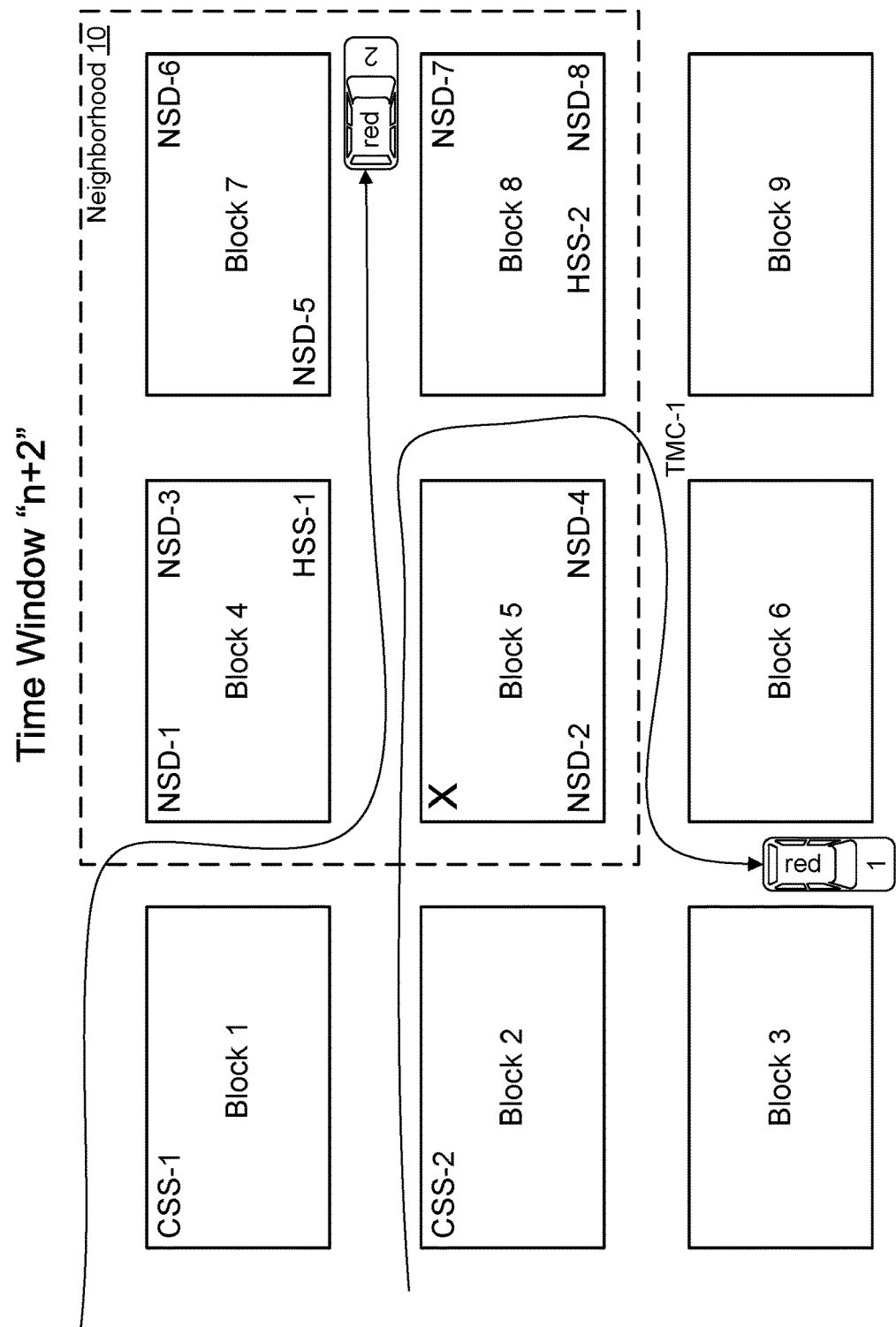

FIGS. 1A-1C collectively illustrate a surveillance scenario in which an embodiment of a dynamic surveillance and object-based query ("DSOQ") system according to the solution may be advantageously employed. The surveillance scenario illustrated by FIGS. 1A-1C is exemplary in nature and is provided as a hypothetical basis from which embodiments of the solution may be suitably described and understood. It will be understood that the illustrations of FIGS. 1A-1C and the exemplary, non-limiting surveillance scenario provided below in no way suggest that applications of the solution are limited.

Returning to the FIGS. 1A-1C, consider a burglary event in a neighborhood 10 that employs a neighborhood watch system. The neighborhood watch system is a component network of a dynamic surveillance network. The neighborhood watch system has a geographic footprint that spans four blocks—Block 4, Block 5, Block 7, Block 8. The burglary took place at the house marked "X" on Block 5 and it occurred sometime within a 24-hour period. The neighborhood watch system leverages multiple neighborhood surveillance devices, NSD-1 through NSD-8, strategically located around the neighborhood and focused on the streets of the neighborhood.

House X does not have any sort of independent security system in place; however, in addition to the neighborhood watch system, multiple houses in the neighborhood employ private home security systems HSS-1, HSS-2 that include video surveillance devices configured to capture footage associated with their respective premises (each home security system forming its own component network within the dynamic surveillance network).

Also, a nearby traffic light intersection outside the geographic footprint of the neighborhood 10 includes a traffic monitoring camera TMC-1 that captures video of any and all vehicles that pass through the intersection, including a picture of the associated license plates (the traffic monitoring camera forms its own component network within the dynamic surveillance network). And, nearby convenience stores outside the geographic footprint of the neighborhood 10 use commercial security systems CSS-1, CSS-2 with video surveillance devices (each commercial security system forming its own component network within the dynamic surveillance network).

A pedestrian with a portable recording device PRD-1 frequently walks through neighborhood 10. All of the exemplary surveillance devices CSS-1, CSS-2, HSS-1, HSS-2, NSD-1 through NSD-8, PRD-1 and TMC-1 are configured to record video and, optionally, upload the recorded footage to an embodiment of a dynamic surveillance and object-based query ("DSOQ") system according to the solution. Further, depending on a particular embodiment, exemplary surveillance devices may upload recorded footage for a first time based on an "opt-in" permission and, subsequently, upload recorded footage at a request or command of the DSOQ embodiment. In this way, embodiments of the solution may avoid upload and management of irrelevant or unneeded video footage at the DSOQ.

FIG. 1A represents activity in the neighborhood 10 at time window "n." During time window "n," a red car #1 entered neighborhood 10 between Block 5 and Block 8, drove straight through, and exited neighborhood 10 between Block 4 and Block 7. During the same time window "n," a blue car #1 entered the geographic footprint of neighborhood 10 between Block 1 and Block 4, turned left between Block 4 and Block 5, drove straight through, and exited neighborhood 10 between Block 7 and Block 8.

Red car #1 was captured as video content by TMC-1, NSD-4, PRD-1, and NSD-3. Similarly, blue car #1 was captured as video content by NSD-1, NSD-5 and NSD-7. Notably, the pedestrian manning PRD-1 didn't video blue car #1 due to recognizing the car and its driver as a local resident. By contrast, the pedestrian manning PRD-1 recorded video of red car #1, whether unintentionally while recording something else, or intentionally when noticing that the car was being driven slowly by a person the pedestrian didn't recognize.

FIG. 1B represents activity in neighborhood 10 at time window "n+1." During time window "n+1," a blue car #2 entered neighborhood 10 between Block 4 and Block 5, drove straight through, and exited neighborhood 10 between Block 7 and Block 8. Blue car #2 was captured as video content by surveillance devices CSS-1 (blue car #2 stopped for gas), NSD-5 and NSD-7.

FIG. 1C represents activity in neighborhood 10 at time window "n+2." During time window "n+2," red car #2 entered the geographic footprint of neighborhood 10 between Block 1 and Block 4, turned left between Block 4 and Block 5, drove straight through, and exited neighborhood 10 between Block 7 and Block 8. Red car #2 was captured as video content by NSD-1, NSD-5 and NSD-7.

Also during time window "n+2," red car #1 makes a second appearance in neighborhood 10. Red car #1 enters neighborhood 10 between Block 4 and Block 5, turned right between Block 5 and Block 8, turned right again between Block 5 and Block 6, then exited the geographic footprint of neighborhood 10 by turning left between Block 5 and Block 6. Red car #1 was captured as video content during time window "n+2" by CSS-1 (driver of red car #1 filled up red car #1 with gas and bought a candy bar), NSD-1, NSD-4 and TMC-1.

Referring to each and all of FIGS. 1A-1C, which illustrate different time windows and a dynamic geographic footprint relevant to a burglar investigation at house X, video content relevant to the burglar investigation may have been captured by any one or more of the various surveillance devices of the various component networks. As previously noted, investigators relying on the prior art would have to independently seek out and watch footage from each surveillance device of each component network over a given window of time—no piece of footage could go unwatched lest a relevant content be missed. In this way, users of the prior art may spend significant amounts of time identifying video sources and watching footage in an effort to identify relevant content. Advantageously, and as will become more apparent from the illustrations and description that follows, embodiments of a DSOQ system may aggregate video footage collected from multiple independent component network sources, analyze the footage, and store the footage based on the results of the analysis so that the footage may be queried in view of content and not just time/location.

Returning to the application scenario illustrated by FIGS. 1A-1C, investigators of the burglary event may put out a public notice seeking any information that may be relevant to the burglary. In response, the pedestrian associated with PRD-1 in FIG. 1A may let investigators know that she had recently witnessed an out of place car in neighborhood 10. Subsequently, an upload to the DSOQ system of the video taken on PRD-1 during time window "n" of red car #1 would get analyzed such that the red car #1 is identified as to make and color.

Focusing on the red car #1 "lead," the investigators may leverage the DSOQ system to return any footage captured by any of the NSD cameras of the neighborhood watch system that contains red car #1, dating back to the time stamp of the video captured by PRD-1. The DSOQ system may then return footage captured by NSD-4 and NSD-3 during time window "n" as well as footage captured by NSD-1 and NSD-4 during time window "n+2." Notably, and advantageously, the investigators could rule out any footage captured during time window "n+1" as no red car was identified by the DSOQ system in any content associated with video footage taken during that window. Further, depending on the statistical confidence of the object detection for footage taken during time window "n+2," video footage containing red car #2 may also be ruled out for viewing.

Using information from viewing of all footage with red car #1, the investigators may be able to narrow the time window during which red car #1 was in or around neighborhood 10. Dynamically increasing the zone of interest to other component networks within the dynamic surveillance network and expanding the query for video footage with content having a red car, the investigators may leverage the DSOQ system to identify video footage taken by CSS-2 when the driver of red car #1 purchased gas and a candy bar.

Advantageously, because the footage from CSS-2 may be queried and returned by the DSOQ system based on having the red car #1, investigators may avoid watching untold hours of irrelevant footage captured by CSS-2. With the relevant footage returned from CSS-2, the investigators may be able to identify the face of the driver of red car #1 when he purchased the candy bar. Now, with face recognition data points, the investigators may be able to query the DSOQ system for any footage captured by HSS-1 or HSS-2 having a person with matching face recognition data points. In this way, investigators may be able to determine that the driver of red car #1 peered into the windows of the house associated with HSS-1.

Adding it all up, investigators may be able to use the time stamps of the various footages returned by the DSOQ system to create a timeline that puts the driver of red car #1 at the CSS-2 convenience store 30 minutes before being captured by HSS-1 and 45 minutes before exiting neighborhood 10 and being captured by NSD-4. The timeline may then create probable cause for questioning the driver of red car #1 with regards to the burglary at house X. Further, query of DSOQ for the red car #1 may return video footage by TMC-1 that captures and decodes the license tag of red car #1 at the time of its exit from the neighborhood 10.

Figure 2:
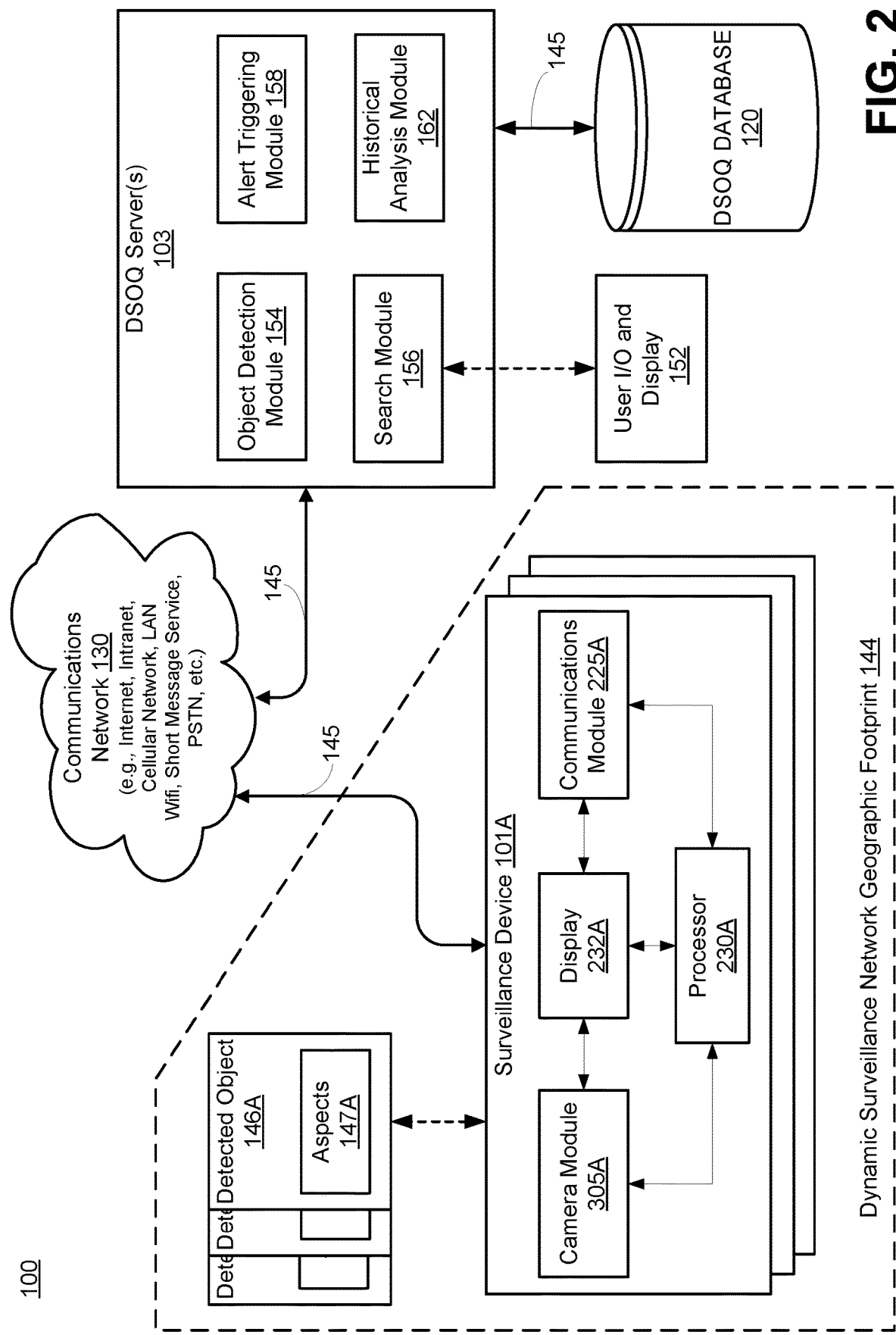
FIG. 2 is a functional block diagram illustrating exemplary components of a dynamic surveillance and object-based query ("DSOQ") system according to an embodiment of the solution.

FIG. 2 is a functional block diagram illustrating exemplary components of a dynamic surveillance and object-based query ("DSOQ") system 100 according to an embodiment of the solution. The surveillance device 101 (more detail in FIG. 3 illustrations and related descriptions) may form part of a DSOQ system 100 and may be equipped with, among other components and functionality, a camera module 305A, a display 232A, a communications module 225A and a processor 230A.

Using the camera module 305A, the SD 101A may leverage a camera subsystem to capture video footage that is uploaded to the DSOQ server 103 via communications network 130. The video footage may contain content representative of detected objects such as, but not limited to, a human being, an animal, an automobile, a bicycle, etc. A detected object may have unique aspects 147 that are also identifiable from an analysis of the video footage.

In application, SD 101A may be anywhere in the geographic footprint 144 of the dynamic surveillance network. A zone of interest to any SD101A may be "scanned" or videoed such that a video stream comprised of a series of frames, as would be understood by one of ordinary skill in the art, is captured and recorded. The video stream may be stored in a local storage medium to the SD 101 and/or transmitted via network 130 to DSOQ server 103 and/or DSOQ database 120, depending on an exemplary embodiment.

The object detection module 154 analyzes the video on a frame by frame basis, or on a sample frame by sample frame basis in some embodiments, to identify objects and/or their associated symbology codes captured in the video. Using methodologies more thoroughly described below, the object detection module 154 may use feature learning techniques to identify objects within the video stream (or aspects 147), record fingerprinting data uniquely associated with the captured image of the identified object, leverage symbology decoding logic if applicable, and statistically compare the fingerprint data with that of previously identified objects in order to determine that the currently identified object is one and the same with a previously identified object.

The object detection module 154 may leverage neural networks 507, 509 (See FIGS. 5A-5B) in order to classify identified objects and determine the nature of aspects of the object (e.g., color, type, size, etc.). The object detection module 154 may then store the analyzed video in the DSOQ database 120 in such a way that portions of the video footage are associated with, and thus can be queried by, the objects identified therein.

The search module 156 may take user inputs from I/O and Display 152 and query DSOQ database 120 in order to identify relevant footage for return to Display 152. Advantageously, the inputs from I/O and Display 152 may be object oriented, as opposed to just time/location, such that the search module 156 may query database 120 to find video footage segments previously analyzed by object detection module 154 and determined to contain objects and/or objects with aspects consistent with the user inputs.

The historical analysis module 162 may compare outputs of the analysis by object detection module 154 to link or associate in database 120 all video footage segments containing statistically similar objects. As such, video content stored in database 120 may be queried by search tool 156 such that all video footage containing a common object(s), are returned for user viewing.

The alert triggering module 158 may leverage algorithms and/or filters to recognize from the output of object detection module 154 that a predefined trigger has been realized. It is envisioned that the predefined trigger may be end user defined in some embodiments of the solution—e.g., an end user may predefine that an alert be pushed to a personal device whenever a certain camera device 101A sees a specific aspect 147A such as a school bus. In response, the alert triggering module 158 may generate an alert signal.

For example, alert triggering module 158 may recognize that a person detected in a video segment by object detection module 154 to be at a certain location at a certain time is statistically similar to the teenage daughter of a subscriber to the DSOQ system and, in response, may cause an alert signal (e.g., an SMS communication) to be transmitted over network 130 to a smartphone associated with the subscriber.

The exemplary embodiments of a SD 101 envision remote communication, real-time software updates, extended data storage, etc. and may be leveraged in various configurations by users of system 100. Advantageously, embodiments of SD 101 configured for communication via a computer system such as the exemplary system 100 depicted in the FIG. 2 illustration may leverage communications networks 130 including, but not limited to cellular networks, PSTNs, WiFi, cable networks, an intranet, and the Internet for, among other things, software upgrades, content updates, database queries, data transmission, etc. Other data that may be used in connection with a SD 101, and accessible via the Internet or other networked system, will occur to one of ordinary skill in the art.

The illustrated computer system 100 may comprise a DSOQ server(s) 103 that may be coupled to a communications network 130. The communications network 130 may comprise a wide area network ("WAN"), the plain-old-telephone-system ("POTS), a local area network ("LAN"), the Internet, or any combination of these and other types of networks.

It should be understood that the term "server" may refer to a single server system or multiple systems or multiple servers. One of ordinary skill in the art will appreciate that various server arrangements may be selected depending upon computer architecture design constraints and without departing from the scope of the invention. The DSOQ server 103, in particular, may be coupled to a DSOQ database 120. The database 120 may store various records related to, but not limited to, video footage, content identifiers, time/date stamps, etc.

When a server in system 100, such as but not limited to a DSOQ server 103, is coupled to the network 130, the server may communicate through the network 130 with various different SDs 101 configured for recording video. Each SD 101 may run or execute web browsing and/or web accessing and/or web uploading software or functionality to access the server and its various applications including object detection module 154. Any device that may access the network 130, either directly or via a tether to a complimentary device, may be an SD 101 according to the computer system 100.

The SDs 101, as well as other components within system 100 such as, but not limited to, a wireless router (not shown), may be coupled to the network 130 by various types of communication links 145. These communication links 145 may comprise wired as well as wireless links which may be either uni-directional or bi-directional communication channels, as would be understood by one of ordinary skill in the art of networking.

An SD 101 may include a display 232, a processor 230 and a communications module 225 that may include one or more of a wired and/or wireless communication hardware and a radio transceiver 220. It is envisioned that the display 232, if included in an SD 101, may comprise any type of display device such as a liquid crystal display ("LCD"), a plasma display, an organic light-emitting diode ("OLED") display, a touch activated display, a cathode ray tube ("CRT") display, a brail display, an LED bank, and a segmented display. An SD 101 may execute, run or interface to a multimedia platform that may be part of a plug-in for an Internet web browser.

The communications module 225 may comprise wireless communication hardware such as, but not limited to, a cellular radio transceiver to transmit video, or data extracted from video, as well as other information to exemplary DSOQ server 103, as depicted in the system 100 embodiment. One of ordinary skill in the art will recognize that a communications module 225 may include application program interfaces to processor 230.

It is envisioned that an SD 101 may be configured to leverage the cellular radio transceiver of the communications module 225 to transmit data, such as video content by way of a secure channel using a wireless link 145 to the DSOQ server 103. Communication links 145, in general, may comprise any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

An exemplary SD 101 may also comprise a computer readable storage/memory component 330 (shown in FIG. 3) for storing, whether temporarily or permanently, various data including, but not limited to, video and/or data extracted from video using any combination of the methodologies described in more detail below. The memory 330 may include instructions for executing one or more of the method steps described herein. Further, the processor 230 and the memory 330 may serve as a means for executing one or more of the method steps described herein. Data added to, extracted or derived from the video content may comprise object classification, fingerprint data, symbology data, etc.

Figure 3A:
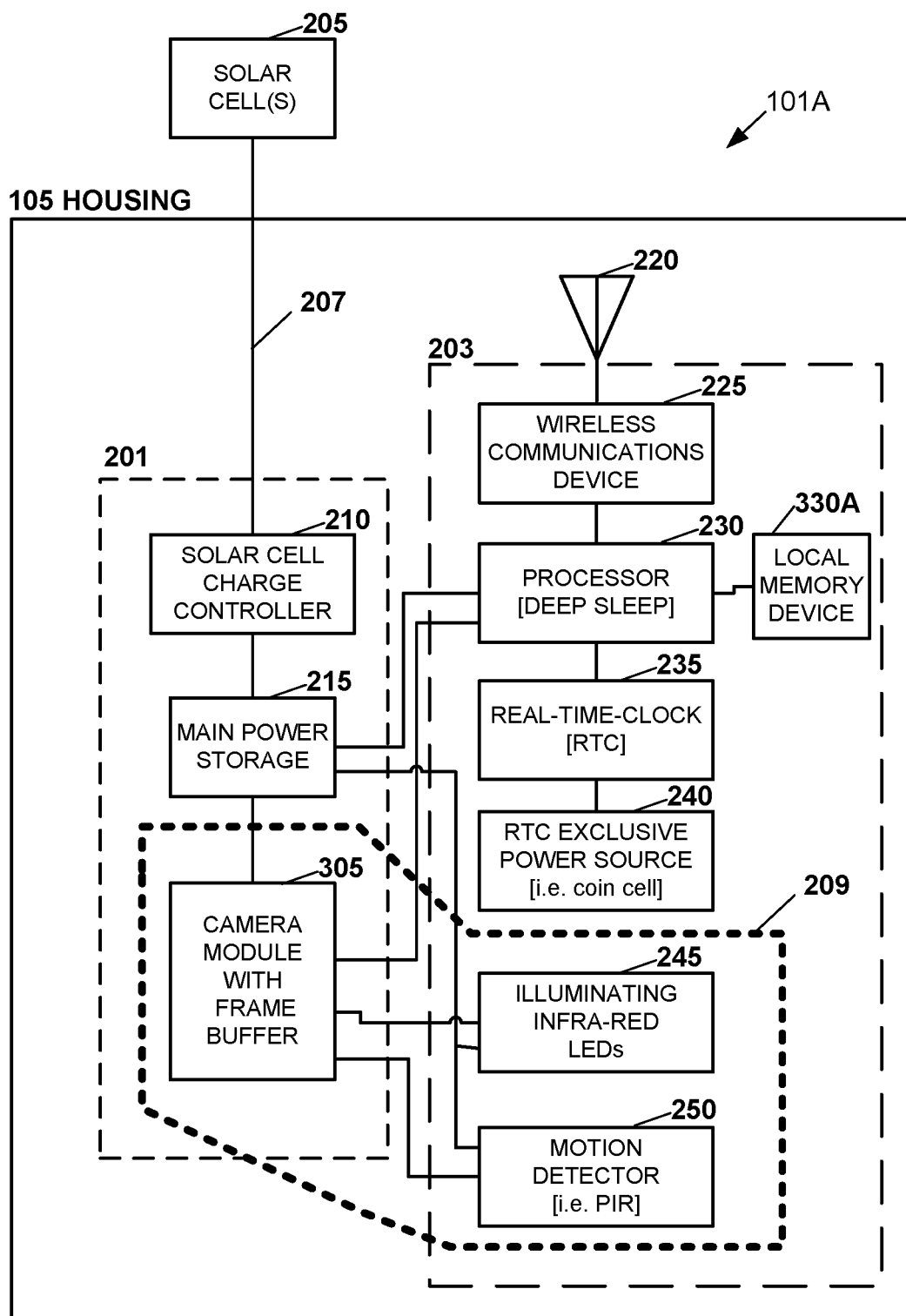
FIG. 3A is a functional block diagram of the hardware and/or software contained within one exemplary embodiment of a video surveillance device that may be comprised within the dynamic surveillance and object-based query ("DSOQ") system of FIG. 2.

FIG. 3A is a functional block diagram of the hardware and/or software contained within one exemplary embodiment of a video surveillance device 101 that may be comprised within the dynamic surveillance and object-based query ("DSOQ") system of FIG. 2. A non-limiting example of an SD 101 that may take the form of the embodiment in FIG. 3A is a video surveillance camera comprised within a neighborhood watch system such as one of neighborhood surveillance devices described in the FIG. 1 illustrations. The SD 101A may comprise solar cells 205, a solar cell charge controller 210, a main power storage 215, a camera module with frame buffer 305, an antenna 220, a wireless communications device 225, a processor, a real-time-clock (RTC) 235, a RTC exclusive power source 240, the illuminating infrared LEDs 245, and a motion detector 250.

The solar cells 205 may be coupled to the solar cell charge controller 210 via a cable 207. The solar cells are usually not mounted to the housing 105 itself, but can be mounted to an existing structure. The solar cells 205 may comprise photovoltaic solar cells for converting sunlight into electrical current. The solar cells 205 may be designed to produce approximately between about 15.0 Watts to about 40.0 Watts of power based on traffic activity and/or solar conditions.

The solar cell charge controller 201 may comprise a processor for managing the storage of the electricity produced by the solar cells 205. The solar cell charge controller 210 may be coupled to the main power storage 215. The solar cell charge controller 201 may intelligently manage the main power storage 215 by monitoring its total power capacity and making sure that the main power storage 215 does not receive energy that exceeds it total power capacity (i.e. such as electrical current when the main power storage 215 comprises a re-chargeable battery).

The main power storage 215 may comprise one or more re-chargeable batteries. According to one exemplary embodiment the main power storage 215 may comprise re-chargeable, lithium-ion batteries. However, other battery types are possible and are within the scope of this disclosure. The main power storage 215 may supply of voltage between about 11.0 Volts to about 13.0 Volts, and preferably about 12.0 Volts of electrical power. While the exemplary embodiment of the camera system 101A illustrated in FIG. 3A is designed for generating its own power through solar energy, other energy sources may be provided in addition to solar energy or as an alternative to solar energy. Other energy sources include wind power, hydro-power, as well as a power line from an electrical grid.

The main power storage 215 may be coupled to the camera module 305, the motion detector 250, the illuminating infrared LEDs 245, and to the processor 230 for supplying power to these elements. The camera module 305, the motion detector 250, and illuminating infrared LEDs 245 have been enclosed by box 209 to illustrate that these three elements work together while the main processor 230 is sleeping or in its stand-by/low power mode.

The camera module 305 has a lens 310 which helps in generating and capturing images and/or video of objects as described above in connection with FIGS. 1A-1C. Further details of the camera module 305 will be described below in connection with FIG. 3B.

The main power storage 215 may supply power to the processor 230 when it is woken from a deep sleep cycle. The main power storage 215 may also supply power to the motion detector 250. The motion detector 250 is responsible for detecting objects within a field of view produced by the lens 310 and then triggering the camera module 305 to take several pictures/images of the detected object 120.

The motion detector 250 may comprise a passive infrared (PIR) sensor. The motion detector may detect PIR light in the range between about 850.0 nanometers and 960.0 nanometers. The motion detector 250 senses heat fluctuations caused by moving objects 120. In other exemplary embodiments, the motion detector 250 may comprise a microwave, ultrasonic, or tomographic sensors or any combination thereof.

The motion detector 250 triggers the camera module 305 to take one or more pictures/images and/or video of an object 120 that has been detected. The camera module 305 usually takes several images and/or seconds/minutes of video of the detected object which is within the field of view.

The camera module 305 may turn on the illuminating infrared LEDs 245 if the time of day [i.e. lighting conditions] and/or weather conditions [i.e. rain, snow, etc.] are communicated by the processor 230.

While the camera module 305 is taking one or more images of detected objects within its field of view, the processor 230 may be in a deep sleep cycle. When the processor 230 is woken from its deep sleep cycle, it is designed to review the images captured by the camera module 305 and to determine if the images/video are significant or noteworthy enough to upload over the computer communications network 130 to the DSOQ server 103.

Specifically, when processor 230 wakes and reviews the captured images and/or video of one or more objects, it will also make note of the "quality" of the images/video, including but not limited to brightness, blurriness, etc. The processor 230 may use well known techniques to determine these quality values. If the images and/or video are not of sufficient quality, the processor 230 will send a message containing a recommended adjustment of camera settings that is recorded in the camera module's memory device 330B. This settings message created by the processor 230 may include, but is not limited to, the following: the current time as kept by the RTC 235; if the camera module 305 turn on the infrared illuminating LEDs 245 when capturing images/video for the current conditions; what shutter speed should be used; and what ISO to use when capturing images.

This intelligent screening/filtering by the processor 230 may comprise the processor 230 applying a neural network based algorithm, and specifically, a recurrent convolutional neural network (RCNN) or a you-look-only-once (YOLO) neural network algorithm. The neural network algorithms may be applied by the processor 230 in order to detect objects within the images/video and to assign confidence scores to objects (i.e. rank objects) that are detected. Further details of the processor 230 applying a neural network algorithm will be described below in connection with FIGS. 5A-5B.

The processor 230 may execute the neural network algorithms in software and/or hardware. The software containing the neural network algorithms may be stored in a local memory device 330A and/or a memory device 330B associated with the camera module 305 (See FIG. 3). The memory devices 330 may comprise flash memory, double-data rate (DDR) memory, and/or any types of non-volatile memory. However, volatile memory types may be employed without departing from this disclosure. Additionally, a combination of volatile and non-volatile memory types may also be employed as understood by one of ordinary skill in the art.

With this intelligent screening and/or filtering of images by the processor 230, the processor 230 is selective for which images are uploaded to the DSOQ server 103. And when the processor 230 is selective for the images which are captured, this reduces the amount of images/video which are/is uploaded to the DSOQ server 103. Therefore, this reduction of the transmission of images and/or video over the communications network 130 significantly reduces power consumption of the entire camera system 101A because the wireless communications device 225 is activated only minimally.

As one illustration of the power savings provided by the inventive camera system 101A, the camera module 305 may consume about 10.0 milliamps of power when it is capturing images of an object 120. Meanwhile, during a powering-up segment for the processor 230, the processor 230 while it is reviewing images taken and stored in the camera module 305 may consume about 100.0 milliamps of power.

When the processor 230 has filtered the images/video captured by the camera module 305 and is ready to transmit the images which have survived the filter, then the wireless communications device 225 in combination with the antenna 220 may consume about 2.0 Amps of power per transmission. Thus, with the processor 230 reducing the number of images transmitted to the DSOQ server 103, it may significantly reduce the amount of power consumed by the camera system 101A by only operating the wireless communications device 225 only minimally.

The processor 230 may be coupled to the wireless communications device 225 and to a real-time-clock 235. The wireless communications device 230 may comprise a radio-frequency transceiver with a modem for communicating with a cellular telephone network. Other wireless communications devices 230 besides radio-frequency (RF) types may be employed without departing from the scope of this disclosure. Other wireless communications devices 230 include, but are not limited to, acoustic communication devices, optical/infra-red based communications devices, and electromagnetic induction type communication devices.

In addition to the wireless communication device 230, the processor 230 may be coupled to a real-time-clock 235. The real-time-clock 235 provides the processor 230 with the time of day, day of month, and year for the processor 230. The RTC 235 is employed such that the processor 230 may enter into a deep sleep cycle so that it is not dependent on its own internal clock(s) which may become idle and/or unused during a sleep cycle. The RTC 235 may also provide its time data to the camera module 305 so that the cameral module 305 may date stamp each of the images that it captures for objects.

The RTC 235 may be coupled to an exclusive power source 240 that is designed to supply energy only to the RTC 235. According to one exemplary embodiment, the RTC exclusive power source 240 may comprise a battery. For example, the battery may be a coin-sized battery cell. The battery may supply power to the RTC 235 on the order of years, such as between 5.0 and 10.0 years.

In addition to the RTC exclusive power source 240, the processor 230 may be coupled to illuminating infrared light emitting diodes (LEDs) 245 that generate a second field of view within the first field of view. The illuminating infrared LEDs 245, as described above, may generate the second field of view within the first field of view in order to illuminate reflective objects that include license plates 115. The illuminating infrared LEDs 245 are often used by the camera system 101 when image conditions may not be ideal, such as during darkness and/or during inclement weather (i.e. during rain, snow, etc.) when visibility is poor.

The second field of view produced by the illuminating infrared LEDs 245 generally has a magnitude that is less than the first field of view. The second field of view may have a magnitude between about 5.0 degrees to about 15.0 degrees, and preferably about 10.0 degrees. However, other magnitudes for the second field of view are possible and are within the scope of this disclosure as understood by one of ordinary skill in the art. The distance or range for the illuminating infrared LEDs 245 may comprise a magnitude between about zero to about 300.0 feet, and usually between zero and about 250.0 feet.

Figure 3B:
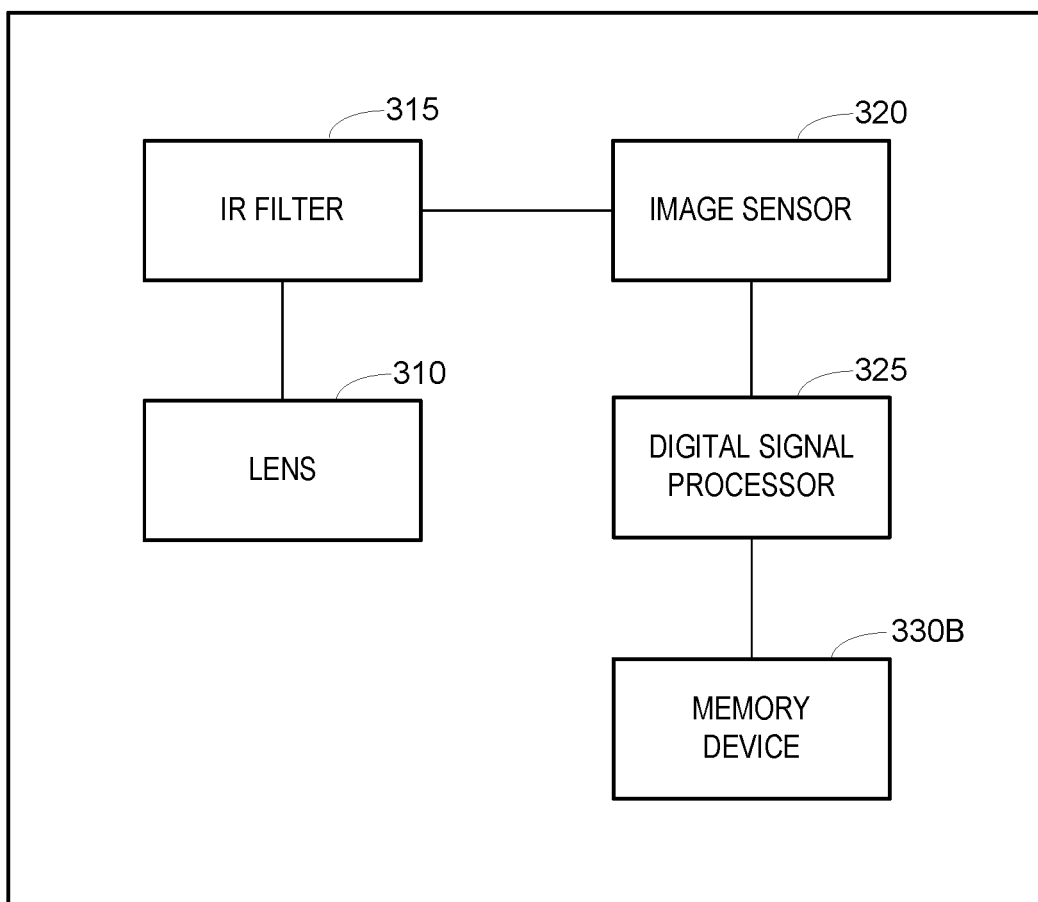
FIG. 3B is a functional block diagram of one exemplary embodiment of a camera module that is one component of the exemplary video surveillance device of FIG. 3B.

FIG. 3B is a functional block diagram of one exemplary embodiment of a camera module 305 that is one component of the exemplary video surveillance device 101 of FIG. 3B. The camera module 305 may comprise a lens, a filter 315, an image/video sensor 320, a digital signal processor 325, and a memory device 330B. As noted previously, the memory device 330B may comprise a DDR type memory device. However, other memory devices 330 are possible and are within the scope of the disclosure.

The lens 310 creates a visual focus and the first field of view for the image/video sensor 320. The filter 315 may comprise an infrared (IR) filter for removing/filtering an infrared light received in the image. As noted previously, the camera module 305 and/or processor 230 may activate one or more illuminating infra-red LEDs 245 for bouncing infra-red light off a detected object within the second field of view. Such activation of the illuminating infra-red LEDs 245 may be helpful when image/video capturing conditions are not ideal (i.e. during inclement weather such as during rain or snow and/or when the time of day is at night and there is very little or no natural light to illuminate any detected objects).

Also, most license plates as of this writing are designed to be very reflective in response to infra-red light in order to enhance digital image capture of license plates. The filter 315 allows the camera module 305 to capture full color images/video during the daytime. The DSP 325 may keep the filter 315 "off" at nighttime so that it can pass through any infrared light generated by illuminating infrared LEDs 245, i.e. so that the reflection of a license plate 115 generated by the infrared light is more visible in the captured image.

The image sensor 320 may comprise a semiconductor charge-coupled device (CCD), a complementary metal-oxide-semiconductor (CMOS), or N-type metal-oxide-semiconductor (NMOS, Live MOS) type of sensor. The image sensor 320 may be coupled to a digital signal processor (DSP) 325. Alternatively, a field gate programmable array (FPGA) may be employed instead of the DSP 325. The DSP 325 may adjust any one of the numerous settings for the image sensor 320. Exemplary settings for the image sensor 320 may include, but are not limited to, exposure [light meter]; aperture; shutter speed; ISO [exposure index rating]; white balance; amount of infra-red light provided by the illuminating infra-red LEDs 245; and depth of field.

The DSP 325 may retrieve and store the digital images produced by the image sensor 320 in the memory device 330B. Like the main processor 230 described above, the DSP 325 may also perform some filtering of the images/video generated by the image sensor 320. The DSP 325 may filter images by removing duplicate images that do not show significant differences between one image to the next.

Specifically, the DSP 325 may remove/delete duplicate images/video of an object when multiple images present very similar information/views of the same object. The DSP 325 may compare multiple images taken of a single object and reduce the number of images taken if the differences from one image/video segment to the next in a series of images/video segments are not statistically significantly different.

For example, for a plurality of images and/or video segments, let's suppose ten images/video segments, which capture a moving object translating at least 10.0 feet across the field of view, the DSP 325 may delete several images such as the second, third, fourth, sixth, seventh, eighth, and ninth images. And thereby, the DSP 325 saves or keeps the first, fifth, and tenth images/video segments of the previously ten-image/ten video segment set. In other words, the DSP 325 has reduced a ten image/ten video segments set to a three image or video set comprising the first, fifth, and tenth images/video segments. This reduction of images by the DSP 325 further reduces the image set uploaded to the DSOQ server 103 that is in addition to the reduction made by the processor 230 employing the neural network algorithm discussed above.

The DSP 325 may store its filtered images in the memory device 330B. As noted previously, the memory device 330B may comprise a DDR type memory device. However, other memory devices 330 are possible and are within the scope of the disclosure. The memory device 330B may have a size that ranges between about 16.0 megabits to about 2.0 gigabytes. The size of the memory device 330B may be selected based on an intended application of the SD 101A.

As noted previously, the SD 101 as illustrated in FIGS. 3A-3B is merely exemplary. Other types/kinds of SD 101 are possible and are included within the scope of this disclosure. Further, combinations of different types of SDs 101 are possible and are also included within the scope of this disclosure. Each SD 101 may or may not have the neural networking filtering described above in connection with FIGS. 3A-3B.

Figure 4:
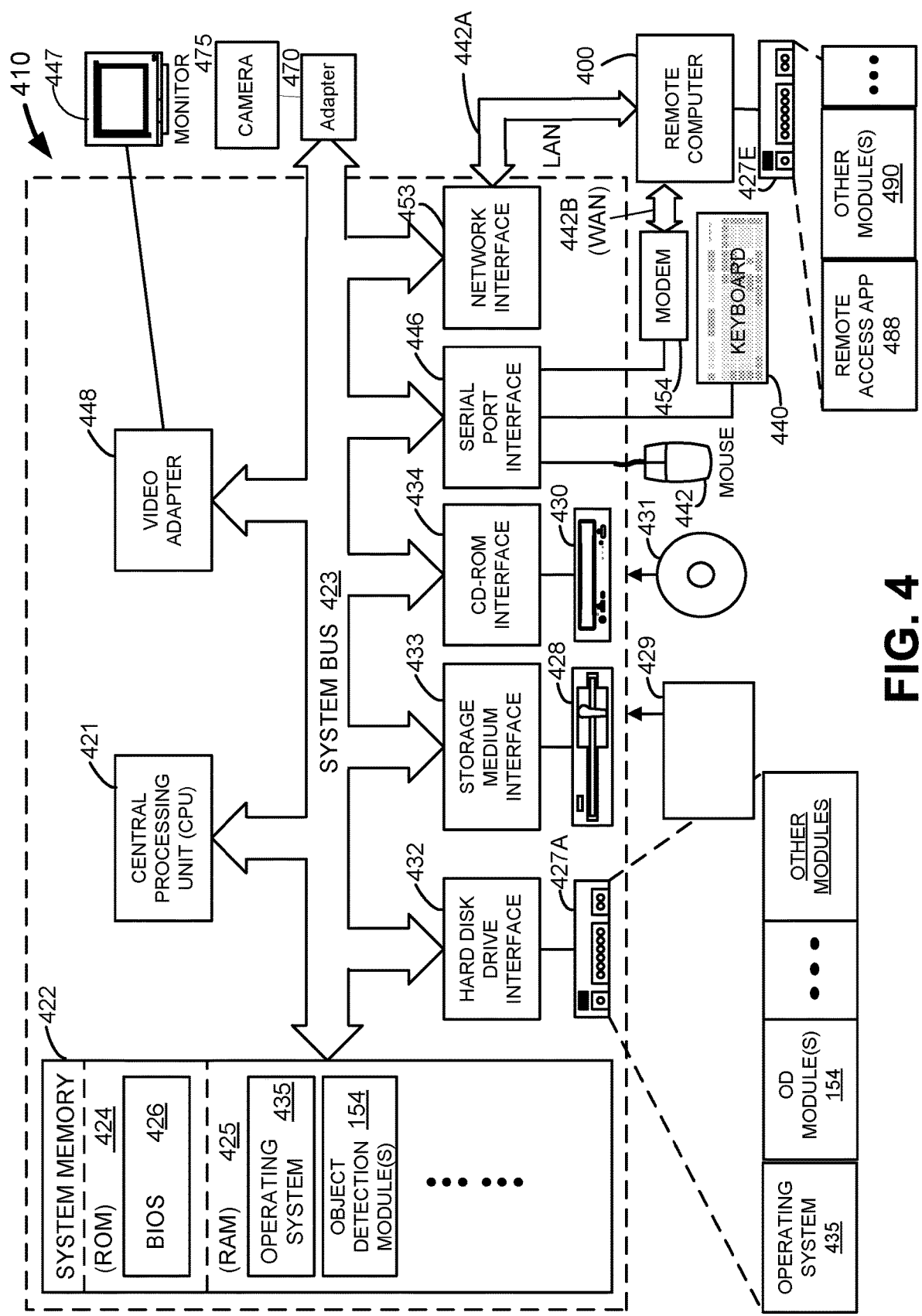
FIG. 4 is a functional block diagram of a general purpose computer that may form the DSOQ server illustrated in FIG. 2.

FIG. 4 is a functional block diagram of a general purpose computer that may form the DSOQ server 103 illustrated in FIG. 2. Generally, a computer 410 includes a central processing unit 421, a system memory 422, and a system bus 423 that couples various system components including the system memory 422 to the processing unit 421.

The system bus 423 may be any of several types of bus structures including a memory bus or memory controller, a peripheral bus, and a local bus using any of a variety of bus architectures. The system memory includes a read-only memory (ROM) 424 and a random access memory (RAM) 425. A basic input/output system (BIOS) 426, containing the basic routines that help to transfer information between elements within computer 410 such as during start-up, is stored in ROM 424.

The computer 410 may include a hard disk drive 427A for reading from and writing to a hard disk, not shown, a memory card drive 428 for reading from or writing to a removable memory card 429, and/or an optional optical disk drive 430 for reading from or writing to a removable optical disk 431 such as a CD-ROM or other optical media. Hard disk drive 427A and the memory card drive 428 are connected to system bus 423 by a hard disk drive interface 432 and a memory card drive interface 433, respectively.

Although the exemplary environment described herein employs hard disk 427A and the removable memory card 429, it should be appreciated by one of ordinary skill in the art that other types of computer readable media which may store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated may be used in internet connected devices such as in surveillance devices ("SDs") 101 that may include personal digital assistants ("PDAs"), mobile phones, portable recording devices, tablet portable computing devices, and the like.

The drives and their associated computer readable media illustrated in FIG. 4 provide nonvolatile storage of computer-executable instructions, data structures, program modules, and other data for computer 410. A number of program modules may be stored on hard disk 427, memory card 429, optical disk 431, ROM 424, or RAM 425, including, but not limited to, an operating system 435 and object detection modules 154. Consistent with that which is defined above, program modules include routines, sub-routines, programs, objects, components, data structures, etc., which perform particular tasks or implement particular abstract data types.

A user may enter commands and information into computer 410 through input devices, such as a keyboard 440 and a pointing device 442 (collectively comprised within User I/O and Display 152). Pointing devices 442 may include a mouse, a trackball, and an electronic pen that may be used in conjunction with a tablet portable computing device. Other input devices (not shown) may include a microphone, joystick, game pad, satellite dish, scanner, or the like. These and other input devices are often connected to processing unit 421 through a serial port interface 446 that is coupled to the system bus 423, but may be connected by other interfaces, such as a parallel port, game port, a universal serial bus (USB), or the like.

The display 447 may also be connected to system bus 423 via an interface, such as a video adapter 448. The display 447 may comprise any type of display devices such as a liquid crystal display (LCD), a plasma display, an organic light-emitting diode (OLED) display, and a cathode ray tube (CRT) display.

A camera 475 may also be connected to system bus 423 via an interface, such as an adapter 470. The camera 475 may comprise a video camera such as a webcam. The camera 475 may be a CCD (charge-coupled device) camera or a CMOS (complementary metal-oxide-semiconductor) camera. In addition to the monitor 447 and camera 475, the computer 410 may include other peripheral output devices (not shown), such as speakers and printers.

The computer 410 may operate in a networked environment using logical connections to one or more remote computers such as the surveillance device(s) 101 illustrated in FIG. 2 and FIG. 3. The logical connections depicted in the FIG. 4 include a local area network (LAN) 442A and a wide area network (WAN) 442B, as illustrated more broadly in FIG. 2 as communications network 130. Such networking environments are commonplace in offices, enterprise-wide computer networks, intranets, and the Internet. When used in a LAN networking environment, the computer 410 is often connected to the local area network 442A through a network interface or adapter 453. The network interface adapter 453 may comprise a wireless communications and therefore, it may employ an antenna (not illustrated).

When used in a WAN networking environment, the computer 410 typically includes a modem 454 or other means for establishing communications over WAN 442B, such as the Internet. Modem 454, which may be internal or external, is connected to system bus 423 via serial port interface 446.

In a networked environment, program modules depicted relative to the surveillance device(s) 101, or portions thereof, may be stored in the remote memory storage device 427E (such as object detection module 154). A surveillance device 101 may execute a remote access program module for accessing data and exchanging data with object detection module(s) 154 running on the computer 410.

Those skilled in the art may appreciate that the present solution for dynamic surveillance and object-based query ("DSOQ") system may be implemented in other computer system configurations, including hand-held devices, multi-processor systems, microprocessor based or programmable consumer electronics, network personal computers, mini-computers, mainframe computers, and the like. Embodiments of the solution may also be practiced in distributed computing environments, where tasks are performed by remote processing devices that are linked through a communications network, such as network 130. In a distributed computing environment, program modules may be located in both local and remote memory storage devices, as would be understood by one of ordinary skill in the art.

In one or more exemplary aspects, the functions described may be implemented in hardware, software, firmware, or any combination thereof. If implemented in software, the functions may be stored on or transmitted as one or more instructions or code on a computer-readable media. Computer-readable media include both computer storage media and communication media including any device that facilitates transfer of a computer program from one place to another.

A storage media may be any available media that may be accessed by a computer. By way of example, and not limitation, such computer-readable non-transitory media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Figure 5A:
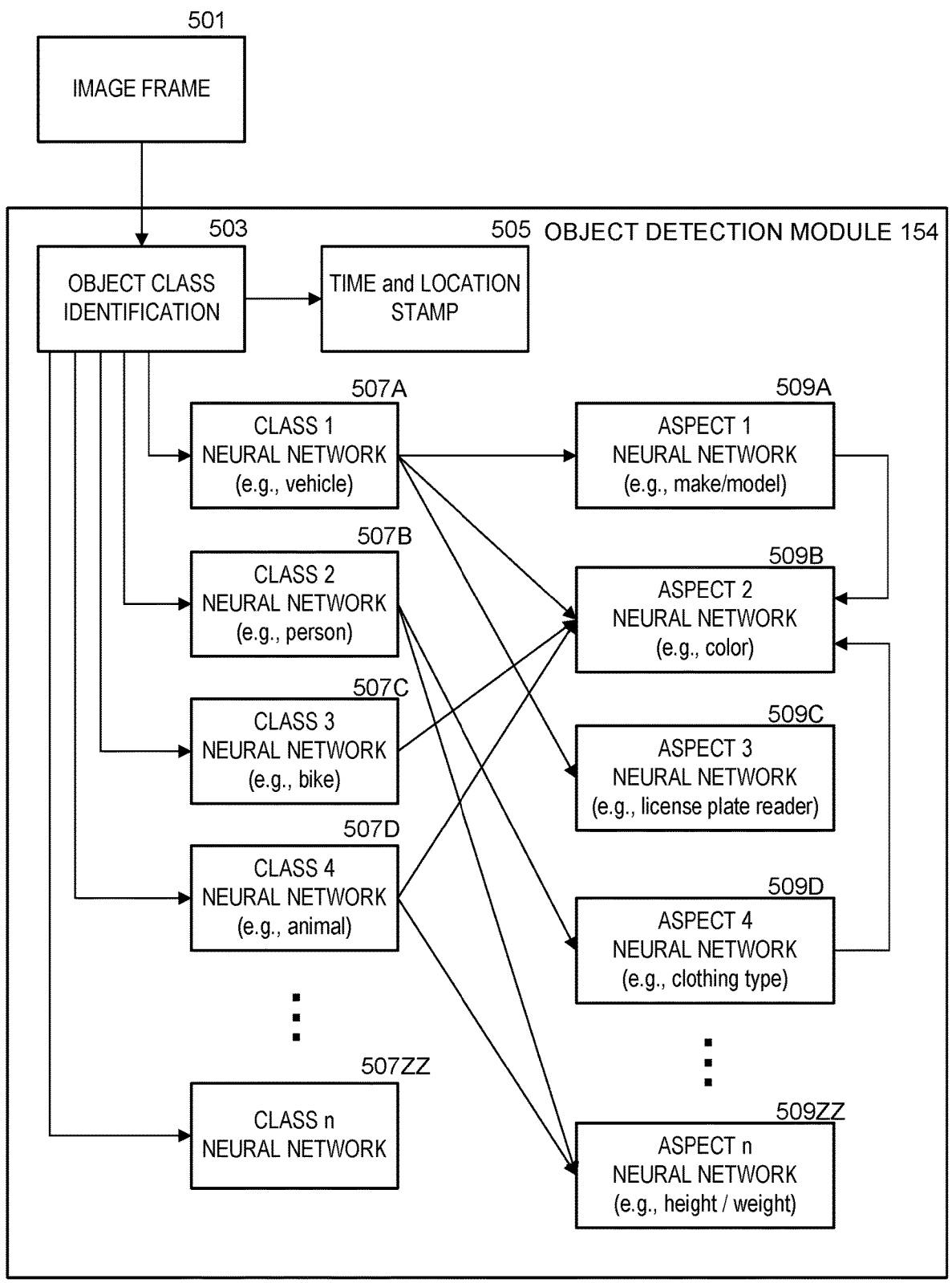
FIG. 5A is a functional block diagram illustrating one embodiment of an object detection module that is one component of the DSOQ server of FIG. 2.

FIG. 5A is a functional block diagram illustrating one embodiment of an object detection module 154 that is one component of the DSOQ server 103 of FIG. 2. Notably, and as previously described, the object detection module 146 may be partly, or wholly, contained within a surveillance device 101 such as, but not limited to, the camera 101A illustrated and described relative to FIGS. 3A and 3B. Further, specific elements of an SD 101 may execute/act as the object detection module, such as the DSP 325 and/or camera module 305 as described above in connection with FIGS. 3A-3B.

A video stream captured by a surveillance device (SD) 101 is comprised of a series of image frames 501, as one of ordinary skill in the art would understand. Embodiments of the solution may analyze each and every image frame 501 of a video stream or, alternatively, may analyze only a sample portion of the image frames that form a given video stream or footage. Regardless, the object detection module 154 analyzes on a frame by frame basis to identify and classify objects (i.e. see cars of FIGS. 1A-1C) captured in the video stream.

Returning to FIG. 5A, an image frame 501 is input to the object detection module 154. The object detection module 154 leverages a cascade of neural networks 507, 509 in order to identify and classify objects (503) captured in the image 501. Each image 501 is associated with a time and location stamp 505, as would be understood by one of ordinary skill in the art. The time and location metadata associated with a given image frame 501 and, by extension, a given length of video footage that contains the image frame 501, is stored in the DSOQ database 120 along with the image frame 501 (as a part of a footage segment). Also stored in the database 120 in association with the video footage is data indicative of content identified by the object detection module 154.

The object detection module 154 begins by identifying objects of interest in a given image frame 501. Objects of interest may be identified based on feature learning techniques. Methodologies for identifying relevant features of objects may be, but are not limited to, Shi-Tomasi corner detection algorithms or Harris Corner Detection Method, as would be understood by one of ordinary skill in the art. With an object identified in the image frame 501, the object detection module 154 leverages a cascade of neural networks 507, 509 to identify aspects of the object.

For example, if the object class of the identified object is that of a human being, then the object detection module 154 may further analyze the image 501 using a neural network module 507B configured to identify different classes of people (male, female, race, etc.). Subsequently, with aspects of the person identified, the object detection module 154 may leverage other, more detailed neural networks 507, 509 to further identify aspects of the person such as, but not limited to, a neural network 509D for identifying clothing types (jacket, pants, shorts, hat, etc.) and a neural network 509ZZ for gauging height and weight.

As other examples, a neural network 507A may be assigned to determine if an image 501 contains a vehicle class of objects. Another neural network 507C may be assigned to determine if an image 501 contains a bicycle class of objects. Similarly, another neural network 507D may be assigned to determine if an image 501 contains an animal class of objects. As understood by one of ordinary skill in the art, other classes of objects are possible and are included within the scope of this disclosure.

For these class objects, other neural networks 509A, 509B, 509C, 509D, and 509ZZ may be assigned to determine if each class of object found by the class neural networks 507 have aspects, such as, but not limited to, make/model of vehicles; colors; license plate readers/recognition modules; clothing types; and/or height/weight of people objects, just to name a few. As understood by one of ordinary skill in the art, other aspects for each class of objects are possible and are included within the scope of this disclosure.

With the outputs from the relevant neural networks 507/509, the object detection module 154 may work to store the outputs in database 120 in association with the image frame 501 (and, by extension, the video footage segment that contains the image frame 501) along with the time and location data. In this way, the database may be configured to be leveraged by the historical analysis module 162 and/or search module 156 and/or alert triggering module 158 as previously described.

Figure 5B:
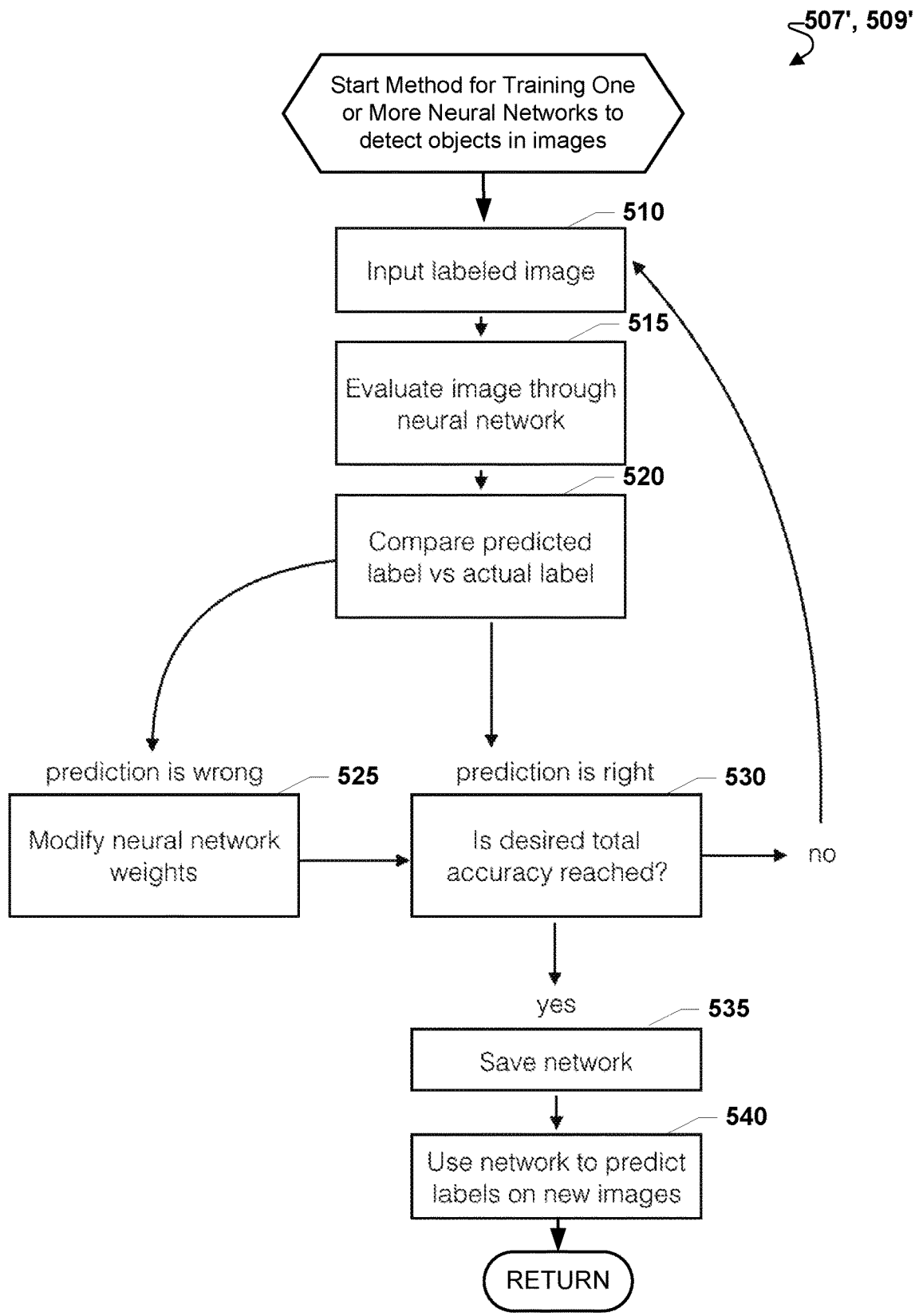
FIG. 5B is a logical flow chart for a method that trains a neural network to detect objects in images.

Referring now to FIG. 5B, this figure is a logical flow chart for a method 507', 509' for training a neural network 507, 509 to detect objects in images 501. This method is usually performed by the DSOQ server 103. Once the method 507', 509' is complete, the server 103 may send the calculated weights for the one or more neural networks [acting as filter(s)] to the object detection module 154 of FIG. 5A.

One goal of the machine-based object detection method 507', 509' as illustrated in FIG. 5B is to be able to input an image (Step 510) and output a label of the objects in that image (e.g. car, dog, etc.) (Step 540). Here, the method 507', 509' may train each neural network 507, 509 of FIG. 5A its particular class or aspect as mentioned above in connection with FIG. 5A. A common technique for creating an object detection system is to train one or more convolutional neural networks via machine learning, where the model's accuracy is improved by being provided examples of correct results.

To accomplish this, a dataset must first be compiled with example images where the objects in the image are labeled prior to training (Step 510). All objects that are desired to be detected must be known and incorporated into the model and example data beforehand. Many existing datasets are available for use, such as COCO and Open Images; otherwise, one may label his/her own images. For training, it is recommended to have at least 50,000 images/video segments of each object to be detected.

With this dataset in hand, a convolutional neural network may be trained to learn how to correctly detect objects in an image. As understood by one of ordinary skill in the art, a neural network usually includes a graph of matrix operations where some matrices have adjustable variables (i.e. weights). One goal of the training process is to be able to adjust these weights so that certain input values (i.e. images) result in certain output values (i.e. correct labels). Existing network architectures exist, such as Faster RCNN and YOLO, and are at least two preferred architectures as of this writing.

The training process for a neural network may include inputting labeled images/video segments into a neural network (Step 510), evaluating the image through the neural network (Step 515), and comparing the predicted label generated by the neural network with the actual label (=label made prior to training) (Decision Step 520).

If there is a difference between the expected and actual values (i.e. loss) as calculated in decision Step 520—where the prediction is wrong/off—the method goes to step 525. If there is no difference between the expected and actual value (i.e. no loss), then the method proceeds to decision Step 530.

In Step 525, the difference between the expected and actual values is calculated and applied to the matrix weights of the neural network such that the loss is reduced for the next iteration of Step 520, improving the accuracy of the neural network.

After Step 525, in decision step 530, it is determined if a desired total accuracy of the neural network has been achieved. If the inquiry to decision Step 530 is positive—meaning that the desired accuracy was achieved in Step 520, then the "Yes" branch is followed to Step 535.

If the inquiry to decision Step 530 is negative—meaning that the desired total accuracy based on the comparison in Step 520 has not been achieved, then the "No" branch is followed back to Step 510 wherein the next training image in the training dataset is inputted into the neural network. In Step 535, the network matrix weights are saved. In step 540, the saved network matrix weights may be used to predict labels for objects 146 (i.e. license plates, cars, people, etc.) in new images (not from the training dataset).

This process is then repeated (returned to Step 510) across the entire dataset until the weights begin to converge. A neural network 507, 509 with converged weights provides consistent accuracy across the entire dataset, yielding an object detection model in which you can input a new image and detect the objects in that image with an expected accuracy.

Once the neural network 507, 509 achieves a desired, selected accuracy, the DSOQ server 103 may transmit the saved network matrix weights to the object detection module 154 so that the one or more neural networks 507, 509 that form the object detection module 154 may be updated.

For a specific neural network training example, see a journal article entitled, "Faster R-CNN: Towards Real-Time Object Detection with Region Proposal Networks," authored by Shaoqing Ren et al. found in the electronic Publication eprint arXiv:1506.01497 and published in June 2015. Particularly, see FIG. 2 of that journal article. One could take the architecture of this neural network of FIG. 2 and implement it in a neural network modeling library such as TensorFlow. Each layer in this FIG. 2 takes an input from the previous layer, does some manipulation of the data, and outputs the new value to the following layer. The specific type of manipulation done depends on the attributes and type of the layer.

For instance, a convolutional layer of a specific size is a set of weights that is convolved across the entire image, producing an activation map for a specific feature across the image. For example, one convolutional layer could be trained to recognize a tire, and one could be trained to recognize a license plate. A subsequent layer may then look at the output of these initial layers and learn that when these features are present, so is a car.

The technique known as back-propagation may be used in order for the system to find the particular weights of a particular feature. In this technique, the layer is convolved across an image, producing a matrix that acts like a heat map, indicating where it believes a specific feature to be located within the image. The system then takes this output and compares it with the expected value (as indicated by the labeled training dataset), and adjusts the weights based on the difference between the expected and the actual output. By using a neural network architecture such as illustrated in FIG. 2 of the aforementioned published journal article along with the technique of back-propagation machine learning, the network is able to learn to identify specific features and their location within an image.

Figure 6:
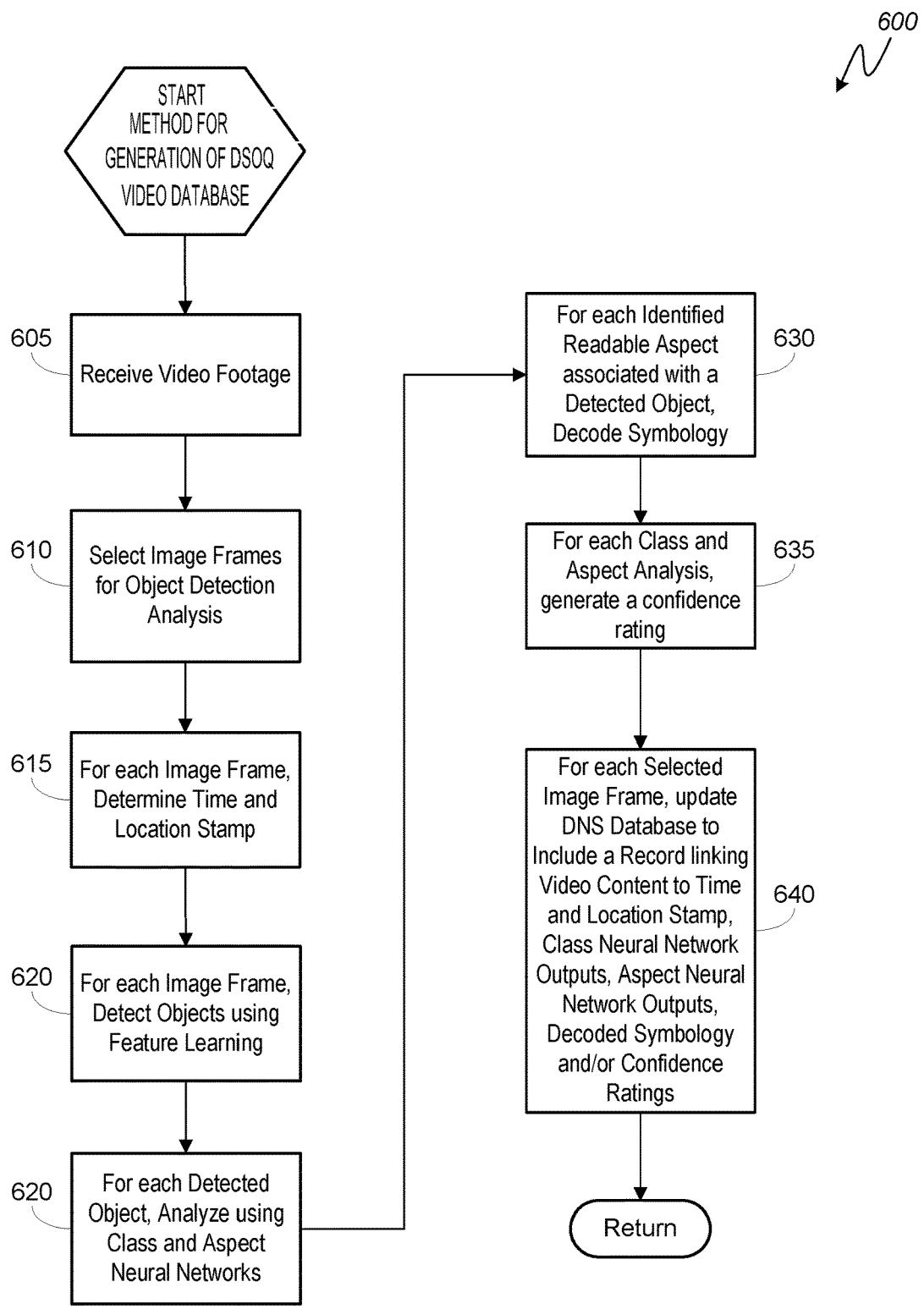
FIG. 6 illustrates a flow chart of an exemplary method for generation of a DSOQ video database according to an embodiment of the solution.

FIG. 6 illustrates a flow chart of an exemplary method 600 for generation of a DSOQ video database 120 according to an embodiment of the solution. Beginning at block 605, video footage is received at the DSOQ server 103. The video footage will have been captured by a surveillance device 101 comprised within the dynamic surveillance network. Notably, unlike prior art solutions that are limited to a predefined geographic footprint, embodiments of the solution may be configured to receive inbound video footage captured and uploaded from any surveillance device and/or surveillance network with the ability to transmit the footage over a wired or wireless connection.

In fact, it is envisioned that embodiments of the solution may effectively "pull" video footage from one or more eligible surveillance devices 101 through opt-in invitations—e.g., a user of the DSOQ system may sent out requests to bystanders and/or video devices in a geographic zone of an event asking for the bystanders and/or video devices to "opt-in" and share data with the DSOQ system. In this way, embodiments of the solution are not limited by a geographic footprint of an isolated surveillance system—surveillance devices wholly unassociated with one another may upload captured video streams and, by doing so, enable embodiments of the solution to dynamically expand geographic coverage as needed for the identification of relevant content.

Returning to the method 600, at block 610 the object detection module 154 selects frames 501 of the received video footage for object detection analysis. Notably, and as previously described, it is envisioned that certain surveillance devices 101 may be configured to perform all or part of the object detection functionality described herein relative to the object detection module 154 within DSOQ server 103, i.e., a given one or more surveillance devices 101 may comprise an object detection module 154. As such, description of object detection module 154 within DSOQ server 103 will be understood to also apply to those surveillance devices 101 having object detection capabilities.

The object detection module 154 may analyze each and every frame comprised within a received video footage or, alternatively, may analyze select frames. Regardless, the object detection module 154 analyzes each frame individually. At block 615, the object detection module 154 determines the time and location stamp metadata for the image frame. This time and location data relates to the geographic location of the surveillance device 101 that captured the footage and, of course, the time at which the footage was captured. At block 620, the object detection module 154 analyzes the frame in order to identify any content captured in the frame such as, but not limited to, a person, an animal, an automobile and the like.

At block 625, feature learning techniques in conjunction with the application of neural networks 507, 509 of FIGS. 5A-5B may be leveraged/applied by the object detection module 154 in order to classify (507) an identified object (e.g., vehicle) and determine the nature of various aspects (509) of the object (e.g., color, make, model, license tag symbology, etc.). At block 630, if the identified aspect (509) of the classified object is readable (i.e., it contains a symbology), such as a license plate, then embodiments of the solution may decode the symbology.

A confidence rating may also be computed at block 635, the confidence rating giving a statistical likelihood for the accuracy of the object classification and aspect determinations. For example, the gender of a person identified in an image frame 501 may be difficult to determine with any high level of confidence due to the type of clothing being worn. In such a case, the object detection module 154 may conclude, based on neural network analysis, such as described in FIG. 5A, that the person is likely a male but with a relatively low confidence score.

At block 640, the outputs of the neural network analysis conducted by the object detection module 154 are stored in database 120 along with, and in association with, the video footage containing the analyzed frame(s). Advantageously, with the time and location data, object detection and classification data, aspect analysis data, and confidence score stored in database 120 in association with the video footage, users of the DSOQ system may easily query footage that may contain relevant content, thereby avoiding the need to unnecessarily view irrelevant video footage. The method 600 returns.

Figure 7:
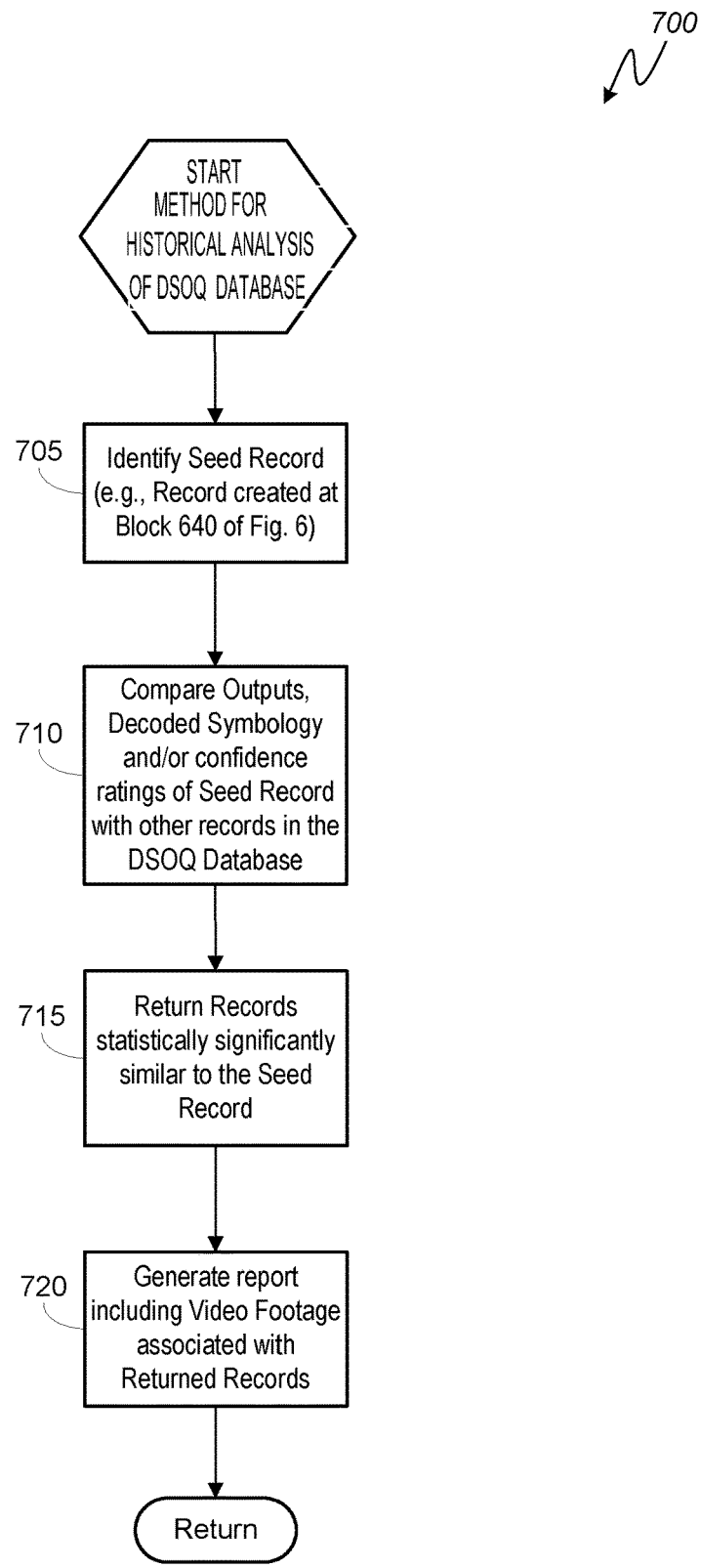
FIG. 7 illustrates a flow chart of an exemplary method for historical analysis of a DSOQ video database according to an embodiment of the solution.

FIG. 7 illustrates a flow chart of an exemplary method 700 for historical analysis of a DSOQ video database 120 according to an embodiment of the solution. Beginning at block 705, the method 700 may identify a seed record. In some embodiments, the seed record may be the record associated with the output analysis of the object detection module 154. Using the seed record, at block 710 the historical analysis module 162 may compare the object detection analysis outputs associated with the seed record to outputs associated with and stored with other video footage and/or image frames. In this way, the historical analysis module 162 may statistically determine that some or all of the content in the seed record is the same as, or statistically likely to be the same as, content captured in other video footage and/or image frames stored in database 120.

At block 715, the historical analysis module 162 may return to the user any and/or all records in database 120 that are statistically significantly similar to the seed record. It is envisioned that users may modify the statistical threshold in an effort to return records of footage that have been analyzed to contain very close or identical content.

Notably, by reducing the statistical confidence of the record comparisons, the historical analysis module 162 may return relatively more records from database 120, as would be understood by one of ordinary skill in the art. Alternatively, parameters may be set such that the historical analysis module 162 returns only records that "match" and have a certain confidence level indicating the statistical accuracy of the records.

At block 720, the historical analysis module 162 may generate a report including the video footage associated with identified records. The method 700 returns.

Figure 8:
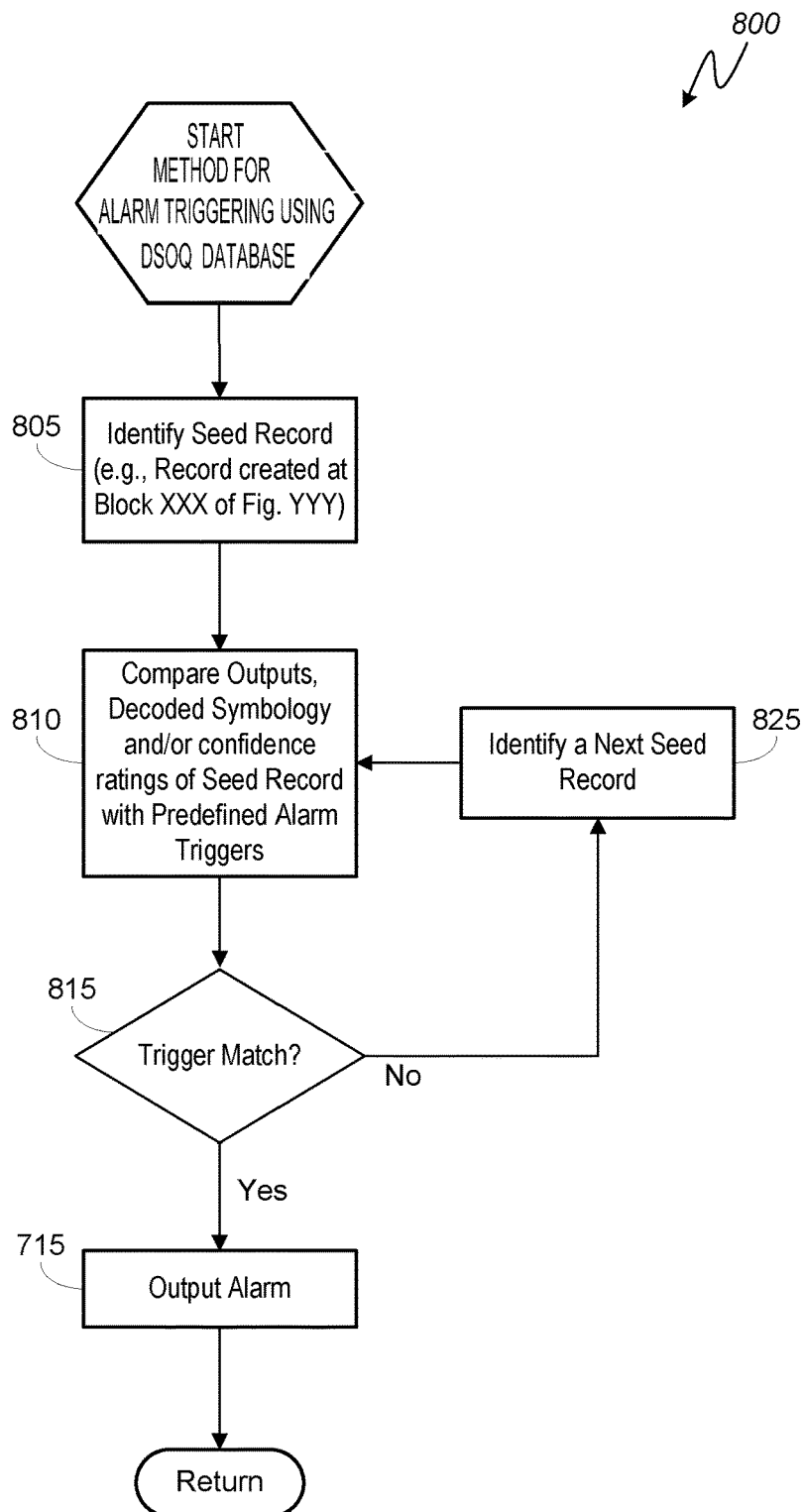
FIG. 8 illustrates a flow chart of an exemplary method for alarm triggering based on a DSOQ video database according to an embodiment of the solution.

FIG. 8 illustrates a flow chart of an exemplary method 800 for alarm triggering based on a DSOQ video database 120 according to an embodiment of the solution. Beginning at block 805, the method 800 may identify a seed record. In some embodiments, the seed record may be the record associated with the output analysis of the object detection module 154.

Using the seed record, at block 810 the alert triggering module 158 may compare the object detection analysis outputs associated with the seed record to predefined alarm trigger parameters. In this way, the alert triggering module 158 may statistically determine that some or all of the content in the seed record is the same as, or statistically likely to be the same as, predefined alarm trigger parameters.

At decision block 815, if the parameters of the predefined alarm triggers match the object detection analysis outputs, the method 800 may advance to block 820 and output an alarm. It is envisioned that the alarm may take any form such as, but not limited to, an SMS text alarm, an email, an audio signal, etc. If the parameters of the predefined alarm triggers do not match the object detection analysis outputs, then the method may follow the "no" branch from decision block 815 to block 825 where a next seed record is identified (most likely, the next record output from the object detection module 154. The method returns.

Figure 9:
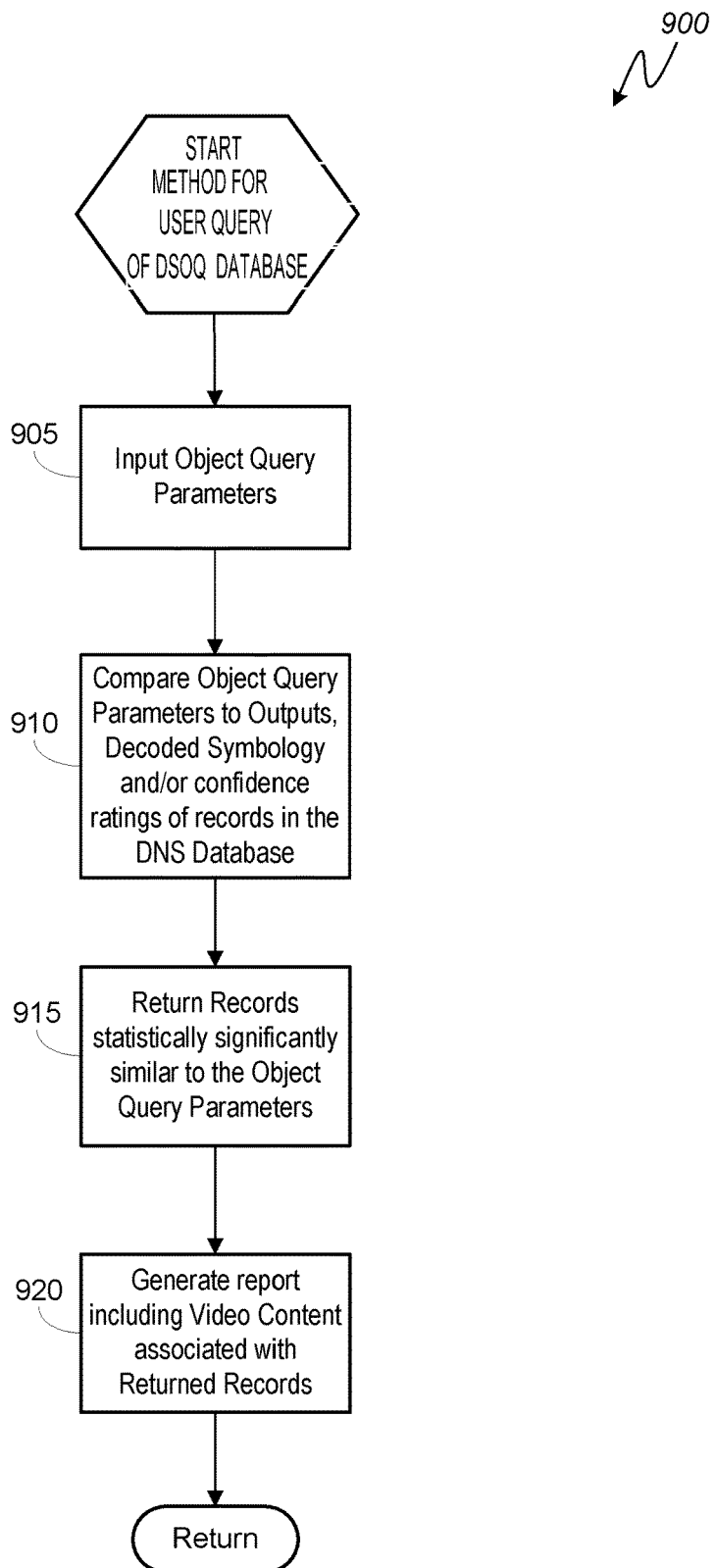
FIG. 9 illustrates a flow chart of an exemplary method for user query a DSOQ video database according to an embodiment of the solution.

FIG. 9 illustrates a flow chart of an exemplary method 900 for user query a DSOQ video database 120 according to an embodiment of the solution. Beginning at block 905, the method 900 may receive input query parameters. The input query parameters may be in the form of a seed record ("return all records statistically similar to this one") or may be in the form of object classes, aspects and/or time and location ("return all records with content of a male wearing blue jeans on MM/DD/YYYY within this geographic zone").

Using the input query parameters, at block 910 the search module 156 may compare the input query parameters to outputs associated with and stored with video footage and/or image frames in the DSOQ database 120. In this way, the search module 156 may statistically determine that some or all of the input query parameters are consistent with, or statistically likely to be the consistent with, content captured in various video footage and/or image frames stored in database 120.

At block 915, the search module 156 may return to the user any and/or all records in database 120 that contain content which is statistically significantly similar to the input query parameters. It is envisioned that users may modify the statistical threshold in an effort to return records of footage that have been analyzed to contain content that is very consistent with the input query parameters.

Notably, by reducing the statistical confidence of the match between the input query parameters and the content of available records, the search module 156 may return relatively more records from database 120, as would be understood by one of ordinary skill in the art. Alternatively, input query parameters may be set such that the search module 156 returns only records that "match" one or more of the input query parameters with high probability and have a certain confidence level indicating the statistical accuracy of the records.

At block 920, search module 156 may generate a report including the video footage associated with identified records. It is envisioned that the report may take any number of formats and/or include any number of information above and beyond the returned video footage and records. For example, it is envisioned that embodiments of the solution may display the returned video footage in a timeline format (using the time stamp metadata), or in a map format (such as by linking the returned video footages to locations on a map overlay), or in an object list format (everything that was seen in a certain location by a given surveillance device, organized by content), or in an "out of place" format (list of footage based on containing content that is not consistent with expected content at the given time and location, as might be determined by the historical analysis module 162 and/or alert triggering module 158). The method 900 returns.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or in parallel with (substantially simultaneously with) other steps without departing from the scope and spirit of the invention. In some instances, certain steps may be omitted or not performed without departing from the invention. Also, in some instances, multiple actions depicted and described as unique steps in the present disclosure may be comprised within a single step. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The functionality of the claimed computer implemented processes is explained in more detail in the above description and in conjunction with the Figures which may illustrate various process flows.

Therefore, although selected aspects have been illustrated and described in detail, it will be understood that various substitutions and alterations may be made therein without departing from the spirit and scope of the present invention, as defined by the following claims.

What is claimed is:

1. A method for generating an object based database of video footage captured by a dynamic surveillance network, the method comprising:
   capturing a first video stream, wherein the first video stream comprises a series of image frames and each image frame comprises content;
   determining time data and location data associated with the first video stream;

analyzing the content of one or more image frames of the first video stream to identify objects;

for each identified object in the first video stream, applying one or more neural network algorithms to classify the identified object and aspects of the identified object;

creating a first database record by storing the first video stream in a database, wherein the first database record includes the first video stream in association with:
the time data and location data; and
the object class data and object aspect data;

providing a user interface for the database for receiving one or more search parameters, each search parameter comprising both time data and location data, and at least one of object class data and object aspect data;

receiving one or more search parameters with the user interface;

filtering the database using the one or more search parameters; and displaying on a display device one or more records from the database matching the search parameters, wherein each of the one or more records from the database comprises a link to a playable video stream containing an object matching the one or more search parameters.

2. The method of claim 1, further comprising:
for each identified object, generating a confidence score for each of one or more of the object class and the aspects; and
storing the one or more confidence scores in the database as a part of the record.

3. The method of claim 1, wherein the video stream was captured by a surveillance device associated with one of a neighborhood watch system, a commercial security system, a traffic light monitoring system or portable surveillance device.

4. The method of claim 1, further comprising:
capturing a second video stream, wherein the second video stream comprises a series of image frames and each image frame comprises content;
determining time data and location data associated with the second video stream;
analyzing the content of one or more image frames of the second video stream to identify objects;
for each identified object in the second video stream, applying one or more neural network algorithms to classify the identified object and aspects of the identified object; and
creating a second database record by storing the second video stream in a database, wherein the second database record includes the second video stream in association with:
the time data and location data; and
the object class data and object aspect data.

5. The method of claim 4, further comprising:
generating a report for the one or more records from the database matching the search parameters in one of a timeline format, a map format and an object format.

6. The method of claim 5, further comprising: displaying the report on the display device.

7. The method of claim 1, further comprising:
based on the classification of the identified object and aspects of the identified object, generating an alarm.

8. A system for generating an object based database of video footage captured by a dynamic surveillance network, the system comprising:
one or more surveillance devices in remote communication with a server, the one or more surveillance devices and server configured to:
capture a first video stream, wherein the first video stream comprises a series of image frames and each image frame comprises content;
determine time data and location data associated with the first video stream;
analyze the content of one or more image frames of the first video stream to identify objects;
for each identified object in the first video stream, apply one or more neural network algorithms to classify the identified object and aspects of the identified object; and
create a first database record by storing the first video stream in a database, wherein the first database record includes the first video stream in association with:
the time data and location data; and
the object class data and object aspect data;

the server being further configured to:
provide a user interface for the database for receiving one or more search parameters, each search parameter comprising both time data and location data, and at least one of object class data and object aspect data;
receive one or more search parameters with the user interface;
filter the database using the one or more search parameters; and
display on a display device one or more records from the database matching the search parameters, wherein each of the one or more records from the database comprises a link to a playable video stream containing an object matching the one or more search parameters.

9. The system of claim 8, the one or more surveillance devices and server further configured to:
for each identified object, generate a confidence score for each of one or more of the object class and the aspects; and
store the one or more confidence scores in the database as a part of the record.

10. The system of claim 8, wherein the video stream was captured by a surveillance device associated with one of a neighborhood watch system, a commercial security system, a traffic light monitoring system or portable surveillance device.

11. The system of claim 8, the one or more surveillance devices and server further configured to:
capture a second video stream, wherein the second video stream comprises a series of image frames and each image frame comprises content;
determine time data and location data associated with the second video stream;
analyze the content of one or more image frames of the second video stream to identify objects;
for each identified object in the second video stream, apply one or more neural network algorithms to classify the identified object and aspects of the identified object; and
create a second database record by storing the second video stream in a database, wherein the second database record includes the second video stream in association with:
the time data and location data; and
the object class data and object aspect data.

12. The system of claim 11, the one or more surveillance devices and server further configured to:

generating a report for the one or more records from the database matching the search parameters in one of a timeline format, a map format and an object format.

13. The system of claim 12, wherein the report is displayed on the display device.

14. The system of claim 8, the one or more surveillance devices and server further configured to:
based on the classification of the identified object and aspects of the identified object, generate an alarm.

15. A system for generating an object based database of video footage captured by a dynamic surveillance network, the system comprising:
means for capturing a plurality of video streams, wherein each of the plurality of video streams comprises a series of image frames and each image frame comprises content;
means for determining time data and location data associated with each of the plurality of video streams;
means for analyzing the content of one or more image frames of each of the plurality of video streams to identify objects;
for each identified object in each of the plurality of video streams, applying one or more neural network algorithms to classify the identified object and aspects of the identified object; and
creating a database record each of the plurality of video streams by storing the respective video stream in a database, wherein the database record includes the respective video stream in association with:
the time data and location data; and
the object class data and object aspect data;
means for providing a user interface for the database that receives one or more search parameters, each search parameter comprising both time data and location data, and at least one of object class data and object aspect data;
receiving one or more search parameters with the user interface;
filtering the database using the one or more search parameters; and
means for displaying one or more records from the database matching the search parameters, wherein each of the one or more records from the database comprises a link to a playable video stream containing an object matching the one or more search parameters.

16. The system of claim 15, further comprising:
for each identified object, means for generating a confidence score for each of one or more of the object class and the aspects; and
means for storing the one or more confidence scores in the database as a part of the record.

17. The system of claim 15, wherein the plurality of video streams were captured by surveillance devices, each surveillance device associated with one of a neighborhood watch system, a commercial security system, a traffic light monitoring system or portable surveillance device.

18. The system of claim 15, further comprising:
means for generating a report for the one or more records from the database matching the search parameters in one of a timeline format, a map format and an object format.

19. The system of claim 18, wherein the report is displayed on the display device.

20. The system of claim 15, further comprising:
means for generating an alarm based on the classification of the identified object and aspects of the identified object.

* * * * *